US007588653B2

(12) United States Patent
Crandell et al.

(10) Patent No.: US 7,588,653 B2
(45) Date of Patent: Sep. 15, 2009

(54) METHOD OF MAKING AN INTEGRATED WINDOW SASH

(75) Inventors: Stephen L. Crandell, Cranberry Township, PA (US); Mehran Arbab, Pittsburgh, PA (US); William B. Davis, Zielenople, PA (US); Raymond G. Gallagher, Pittsburgh, PA (US); William Klingensmith, Pittsburgh, PA (US); Barent A. Rosskamp, Butler, PA (US); Cory D. Steffek, Pittsburgh, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 864 days.

(21) Appl. No.: 10/874,435

(22) Filed: Jun. 23, 2004

(65) Prior Publication Data

US 2005/0028459 A1 Feb. 10, 2005

Related U.S. Application Data

(60) Provisional application No. 60/480,621, filed on Jun. 23, 2003.

(51) Int. Cl.

| | |
|---|---|
| ***C03C 27/00*** | (2006.01) |
| ***E06B 3/24*** | (2006.01) |
| ***E06B 3/00*** | (2006.01) |
| ***E06B 1/00*** | (2006.01) |
| ***E04G 21/00*** | (2006.01) |
| ***E04G 23/00*** | (2006.01) |

(52) U.S. Cl. ..................... 156/109; 52/204.5; 52/741.1; 428/34

(58) Field of Classification Search ................. 156/109; 52/204.5, 741.1; 428/34

See application file for complete search history.

(56) References Cited

U.S. PATENT DOCUMENTS 2,064,530 A 12/1936 Gelstharp et al. ............ 20/56.5

(Continued)

FOREIGN PATENT DOCUMENTS

BE 1012746 A3 3/2001

(Continued)

OTHER PUBLICATIONS

U.S. Appl. No. 60/480,621, filed Jun. 23, 2003.

(Continued)

*Primary Examiner*—Philip C Tucker
*Assistant Examiner*—Michael N Orlando
(74) *Attorney, Agent, or Firm*—Andrew C. Siminerio

(57) ABSTRACT

A method of making an integrated window sash includes providing a sash frame having a first sheet supporting surface, a second sheet supporting surface, and a base extending from the first sheet supporting surface to toward the second sheet supporting surface; applying a layer of an adhesive sealant having a low gas and moisture permeability on the first sheet supporting surface; applying a layer of an adhesive sealant having a low gas and moisture permeability on the second sheet supporting surface; applying a layer of a moisture pervious matrix having a desiccant therein on the base; moving a first sheet having a first major surface and an opposite second major surface into the spacer frame over and spaced from the matrix to move the first major surface of the first sheet against the first layer, and moving a second sheet having a first major surface and an opposite major surface toward the second layer to move the first major surface of the second sheet against the second layer, wherein the first surface of the second sheet is spaced from the second surface of the first sheet to provide a compartment therebetween and the desiccant is in communication with the compartment.

8 Claims, 11 Drawing Sheets

U.S. PATENT DOCUMENTS

| | | | | | |
|---|---|---|---|---|---|
| 2,497,515 | A | * | 2/1950 | Pearse | 52/204.599 |
| 3,238,685 | A | | 3/1966 | Emory | 52/502 |
| 3,758,996 | A | | 9/1973 | Bowser | 52/172 |
| 3,919,023 | A | | 11/1975 | Bowser et al. | 156/107 |
| 4,149,348 | A | | 4/1979 | Pyzewski | 52/172 |
| 4,170,460 | A | | 10/1979 | Donley | 65/30 R |
| 4,239,816 | A | | 12/1980 | Breininger et al. | 427/168 |
| 4,357,744 | A | | 11/1982 | McKenzie et al. | 29/451 |
| 4,462,884 | A | | 7/1984 | Gillery et al. | 204/192 C |
| 4,520,611 | A | | 6/1985 | Shingu et al. | 52/789 |
| 4,564,540 | A | | 1/1986 | Davies et al. | |
| 4,610,711 | A | | 9/1986 | Matesa et al. | 65/134 |
| 4,628,582 | A | | 12/1986 | Leopold | 29/451 |
| 4,649,685 | A | | 3/1987 | Wolf et al. | 52/398 |
| 4,652,472 | A | * | 3/1987 | Davies | 428/34 |
| 4,692,389 | A | | 9/1987 | Gillery et al. | 428/622 |
| 4,719,127 | A | | 1/1988 | Greenberg | 427/165 |
| 4,720,317 | A | * | 1/1988 | Kuroda et al. | 156/250 |
| 4,780,164 | A | | 10/1988 | Rueckheim et al. | 156/104 |
| 4,792,536 | A | | 12/1988 | Pecoraro et al. | 501/70 |
| 4,806,220 | A | | 2/1989 | Finley | 204/192.27 |
| 4,843,773 | A | * | 7/1989 | Richter | 52/204.591 |
| 4,853,256 | A | | 8/1989 | Obringer et al. | 427/152 |
| 4,873,206 | A | | 10/1989 | Jones | 501/71 |
| 4,898,789 | A | | 2/1990 | Finley | 428/623 |
| 4,952,430 | A | | 8/1990 | Bowser et al. | 428/34 |
| 4,994,315 | A | | 2/1991 | Schreiber et al. | 428/76 |
| 5,030,593 | A | | 7/1991 | Heithoff | 501/72 |
| 5,088,258 | A | | 2/1992 | Schield et al. | 52/398 |
| 5,099,626 | A | | 3/1992 | Seeger | 52/314 |
| 5,107,655 | A | | 4/1992 | Lindgren | |
| 5,177,916 | A | | 1/1993 | Misera et al. | 52/172 |
| 5,240,886 | A | | 8/1993 | Gulotta et al. | 501/70 |
| 5,313,761 | A | | 5/1994 | Leopold | 52/788 |
| 5,345,743 | A | | 9/1994 | Baier | 52/455 |
| 5,361,476 | A | * | 11/1994 | Leopold | 29/417 |
| 5,531,047 | A | | 7/1996 | Leopold et al. | 52/172 |
| 5,553,440 | A | | 9/1996 | Bulger et al. | 52/786.13 |
| 5,564,631 | A | | 10/1996 | Leopold | 239/135 |
| 5,593,929 | A | | 1/1997 | Krumwiede et al. | 501/70 |
| 5,617,699 | A | | 4/1997 | Thompson, Jr. | 52/786.13 |
| 5,644,894 | A | | 7/1997 | Hudson | 52/786.13 |
| 5,653,073 | A | | 8/1997 | Palmer | |
| 5,655,280 | A | | 8/1997 | McCommon | 29/243.518 |
| 5,655,282 | A | | 8/1997 | Hodek et al. | 29/469.5 |
| 5,675,944 | A | | 10/1997 | Kerr et al. | 52/172 |
| 5,720,836 | A | | 2/1998 | Gallagher et al. | 156/109 |
| 5,851,609 | A | | 12/1998 | Baratuci et al. | 428/34 |
| 5,873,203 | A | | 2/1999 | Thiel | 52/172 |
| 6,027,766 | A | | 2/2000 | Greenberg et al. | 427/226 |
| 6,055,783 | A | | 5/2000 | Guhl et al. | |
| 6,061,994 | A | | 5/2000 | Goer et al. | 52/786.13 |
| 6,115,889 | A | | 9/2000 | Mickelson | 24/115 R |
| 6,115,989 | A | | 9/2000 | Boone et al. | 52/786.13 |
| 6,159,616 | A | | 12/2000 | Planeta et al. | 428/518 |
| 6,192,652 | B1 | | 2/2001 | Goer et al. | 52/786.13 |
| 6,209,269 | B1 | | 4/2001 | Valderrama | |
| 6,218,024 | B1 | | 4/2001 | Tamber et al. | 428/520 |
| 6,250,026 | B1 | | 6/2001 | Thompson, Jr. | 52/172 |
| 6,289,641 | B1 | | 9/2001 | McCandless | 52/172 |
| 6,339,909 | B1 | | 1/2002 | Brunnhofer et al. | 52/786.13 |
| 6,355,328 | B1 | | 3/2002 | Baratuci et al. | 428/68 |
| 6,401,428 | B1 | | 6/2002 | Glover et al. | |
| 6,463,706 | B1 | | 10/2002 | Guhl et al. | 52/204.62 |
| 6,528,131 | B1 | | 3/2003 | Lafond | 428/34 |
| 6,536,182 | B2 | | 3/2003 | France | |
| 6,581,341 | B1 | | 6/2003 | Baratuci et al. | 52/204.5 |
| 6,662,523 | B2 | | 12/2003 | Hornung et al. | 52/786.13 |
| 6,762,240 | B2 | | 7/2004 | Swarup et al. | 524/560 |
| 6,841,641 | B2 | | 1/2005 | Olson et al. | 526/328.5 |
| 6,868,648 | B2 | | 3/2005 | Glover et al. | |
| 6,877,292 | B2 | | 4/2005 | Baratuci et al. | 52/786.13 |
| 6,889,480 | B2 | | 5/2005 | Guhl et al. | 52/786.13 |
| 7,001,952 | B2 | | 2/2006 | Faler et al. | 525/185 |
| 2002/0189743 | A1 | | 12/2002 | Hornung et al. | |
| 2003/0084622 | A1 | * | 5/2003 | Hornung et al. | 52/172 |
| 2003/0219583 | A9 | * | 11/2003 | Koizumi et al. | 428/304.4 |
| 2004/0123557 | A1 | | 7/2004 | Hornung et al. | |
| 2004/0231255 | A1 | | 11/2004 | Silverman | 52/204.6 |
| 2007/0261325 | A1 | | 11/2007 | Rosskamp et al. | 52/203 |
| 2007/0261358 | A1 | | 11/2007 | Davis et al. | 52/658 |
| 2007/0261359 | A1 | | 11/2007 | Buchanan et al. | 52/684 |
| 2007/0261795 | A1 | | 11/2007 | Rosskamp et al. | 156/556 |

FOREIGN PATENT DOCUMENTS

| | | | |
|---|---|---|---|
| DE | 33 19 787 | A1 | 6/1984 |
| EP | 0 763 645 | A1 | 3/1997 |
| EP | 1055795 | A2 | 11/2000 |
| FR | 2 455 669 | | 11/1980 |
| GB | 832432 | | 4/1960 |
| GB | 1520257 | | 8/1978 |
| GB | 2 072 249 | | 9/1981 |
| JP | 1-128820 | | 5/1989 |
| WO | 91/02864 | | 3/1991 |
| WO | 92/18777 | | 10/1992 |
| WO | 1998/52737 | A1 | 11/1998 |
| WO | 2005/001229 | A2 | 1/2005 |
| WO | 2006002264 | A1 | 1/2006 |
| WO | 2006002269 | A1 | 1/2006 |
| WO | 2006002270 | A1 | 1/2006 |

OTHER PUBLICATIONS

U.S. Appl. No. 10/874,682, filed Jun. 23, 2004.
U.S. Appl. No. 10/874,721, filed Jun 23, 2004.
U.S. Appl. No. 10/874,503, filed Jun. 23, 2004.
PCT Application No. PCT/US04/020182 filed Jun. 23, 2004.
PCT Application No. US2007/075071, filed Aug. 2, 2007.
U.S. Appl. No. 60/839,399, filed Aug. 22, 2006.
PPG Glass Technical Document TD-103, published Dec. 11, 2001.
Amberg-Schwab, S. et al, "Inorganic-Organic Polymers with Barrier Properties for Water Vapor, Oxygen and Flavor", Journal of Sol Gel Science and Technology, ½, 141 (1998).
Decker, C., "Photostabilization of Poly(vinyl chloride) by Protective Coatings", Journal of Vinyl and Additive Technology, vol. 7, Issue 4, Dec. 2001, pp. 235-243.
Selkowitz, Stephen E. et al, United States Statutory Invention Registration No. H975 entitled "Thermal Insulated Glazing Unit", published Nov. 5, 1991.
Langowski, H.-C. et al, "Ultra High Barrier Layers for Technical Applications", 45$^{th}$ Annual Technical Conference Proceedings of the Society of Vacuum Coaters, p. 475 (2002).

* cited by examiner

METHOD OF MAKING AN INTEGRATED WINDOW SASH

RELATED APPLICATIONS

This application claims the benefit of U.S. Provisional Patent Application bearing Ser. No. 60/480,621 filed Jun. 23, 2003, which application in its entirety is incorporated herein.

This application is related to application Ser. No. 10/874,721 filed even date in the names of Stephen L. Crandell et al. for "Integrated Window Sash with Groove for Desiccant Material"; application Ser. No. 10/874,503 filed even date in the names of Barent A. Rosskamp et al. for "Integrated Window Sash with Lattice Frame and Retainer Clip"; application Ser. No. 10/874,682 filed even date in the names of Cory D. Steffek, et al. for "Integrated Window Sash"; and PCT Application Serial No. PCT/US2004/20182 filed even date in the names of Stephen L. Crandell et al. for "Integrated Window Sash and Methods of Making an Integrated Window Sash", herein incorporated by reference.

FIELD OF THE INVENTION

This invention relates to an integrated window sash having an insulating viewing area, and in particular, to a window sash for maintaining two or more sheets, e.g. glass sheets, spaced from one another to provide a sealed gas containing compartment between adjacent sheets, and to a method of making an integrated window sash having an insulating vision area.

BACKGROUND OF THE INVENTION

One practice of fabricating a window sash having an insulating viewing or vision area includes fabricating an insulating glazing unit and mounting the glazing unit in an open area defined by a sash frame. As used throughout this document, the term "sash frame" means a framework made up of one or more straight and/or bent elongated sash members or lineals defining an enclosed open area, and the terms "sash" or "window sash" mean a sash frame having one or more sheets, e.g. but not limited to one or more glass sheets in the enclosed open area bound by the sash frame which area, when having one or more transparent sheets therein, provides a viewing area. The insulating unit can be made in any manner, for example, but not limited to the techniques disclosed in U.S. Pat. Nos. 5,177,916; 5,531,047; 5,553,440; 5,564,631; 5,617,699; 5,644,894; 5,655,282; 5,720,836; 6,115,989; 6,250,026, and 6,289,641. The adjacent sheets of the insulating units are maintained in a spaced relationship to one another by a spacer frame, and the inner marginal edges of the sheets are secured to the spacer frame by a gas and vapor resistant adhesive to provide a sealed gas space or compartment between the adjacent sheets.

In another practice, a glass sheet is secured to each of the ledges of two or more sheet supporting ledges of a sash frame to space the sheets from one another to provide an insulating vision area, for example, as disclosed in U.S. Pat. Nos. 5,653,073 and 6,055,783.

As can be appreciated by those skilled in the art of fabricating window sashes having insulating vision areas, eliminating the manufacturing steps to make an insulating unit significantly reduces the cost of manufacturing a window sash having an insulating viewing area. Although the presently available practices of fabricating window sashes having insulating viewing areas without prefabricated insulating glazing units are acceptable, it can be appreciated by those skilled in the art that it is advantageous to have additional techniques to fabricate such window sashes.

SUMMARY OF THE INVENTION

The invention relates to a method of making an integrated window sash. Non-limiting embodiments of the invention include the following.

A method of making an integrated window sash, including providing a sash frame having a first sheet supporting surface, a second sheet supporting surface, and a base extending from the first sheet supporting surface to toward the second sheet supporting surface; applying a layer of an adhesive sealant having a low gas and moisture permeability on the first sheet supporting surface; applying a layer of an adhesive sealant having a low gas and moisture permeability on the second sheet supporting surface; applying a layer of a moisture pervious matrix having a desiccant therein on the base; moving a first sheet having a first major surface and an opposite second major surface into the spacer frame over and spaced from the matrix to move the first major surface of the first sheet against the first layer, and moving a second sheet having a first major surface and an opposite major surface toward the second layer to move the first major surface of the second sheet against the second layer, wherein the first surface of the second sheet is spaced from the second surface of the first sheet to provide a compartment therebetween and the desiccant is in communication with the compartment.

A method of making an integrated window sash including providing a sash frame having a first sheet supporting surface, a second sheet supporting surface, and a base extending from the first sheet supporting surface to toward the second sheet supporting surface; applying a barrier layer comprising a film of a low gas and moisture permeability material at least on the base, the film selected from plastic and metal; applying simultaneoulsly or in any sequence a layer of an adhesive sealant having a low gas and moisture permeability on the first sheet supporting surface, a layer of an adhesive sealant having a low gas and moisture permeability on the second sheet supporting surface, and a layer of a moisture pervious matrix having a desiccant therein on the barrier layer; moving a first sheet having a first major surface and an opposite second major surface into the spacer frame over and spaced from the matrix to move the first major surface of the first sheet against the first layer, and moving a second sheet having a first major surface and an opposite major surface toward the second layer to move the first major surface of the second sheet against the second layer, wherein the first surface of the second sheet is spaced from the second surface of the first sheet to provide a compartment therebetween and the desiccant is in communication with the compartment.

A method of making an integrated window sash including feeding a plastic resin into a first material receiver of a co-extruder, an adhesive resin into a second receiver of the co-extruder and a barrier layer resin into a third receiver of the co-extruder; moving the resins through a die of the co-extruder to form a lineal having first and second sheet supporting surfaces interconnected by a base and a barrier layer secured to the base by the adhesive resin; cutting the lineal to provide a plurality of sash members; joining the ends of adjacent sash member to provide a sash frame; applying simultaneously or in any sequence a layer of a moisture impervious adhesive sealant on the first sheet supporting surface, a layer of moisture impervious adhesive sealant on the second sheet supporting surface, and a layer of a moisture pervious matrix having a desiccant therein on the base; moving a first sheet having a first major surface and an opposite second major surface into the spacer frame over and spaced from the matrix to move the first major surface of the first sheet against the first layer, and moving a second sheet having a first major surface and an opposite major surface toward the second layer to move the first major surface of the second sheet against the second layer, wherein the first surface of the second sheet is spaced from the second surface of the first sheet to provide a compartment there between and the desiccant is in communication with the compartment.

A method of making an integrated window sash including feeding a plastic resin into a material receiver of an extruder; moving the resin through a die of the extruder to form a lineal having first and second sheet supporting surfaces and a base having a surface the interconnects the first and second sheet supporting surfaces; securing a metal barrier layer to at least the surface of the base as the lineal is formed; cutting the lineal to provide a plurality of sash members; joining the ends of adjacent sash member to provide a sash frame; applying simultaneously or in any sequence a layer of a moisture impervious adhesive sealant on the first sheet supporting surface, a layer of moisture impervious adhesive sealant on the second sheet supporting surface, and a layer of a moisture pervious matrix having a desiccant therein on the base; moving a first sheet having a first major surface and an opposite second major surface into the spacer frame over and spaced from the matrix to move the first major surface of the first sheet against the first layer, and moving a second sheet having a first major surface and an opposite major surface toward the second layer to move the first major surface of the second sheet against the second layer, wherein the first surface of the second sheet is spaced from the second surface of the first sheet to provide a compartment therebetween and the desiccant is in communication with the compartment.

A method of making an integrated window sash, including providing continuous fiber glass strand through a forming die of a pultrusion device; feeding a polymeric material into a first material receiver of a pultrusion device, an adhesive material into a second receiver of the pultrusion device, and a barrier layer material into a third receiver of the pultrusion device; pulling the fiber glass strand through the die as the polymeric materials is formed around the strand to produce a lineal having first and second sheet supporting surfaces, a base having a surface the interconnects the first and second sheet supporting surfaces, and a barrier layer secured to the base by the adhesive material; cutting the lineal to provide a plurality of sash members; joining the ends of adjacent sash member to provide a sash frame; applying simultaneously or in any sequence a layer of a moisture impervious adhesive sealant on the first sheet supporting surface, a layer of moisture impervious adhesive sealant on the second sheet supporting surface, and a layer of a moisture pervious matrix having a desiccant therein on the base; moving a first sheet having a first major surface and an opposite second major surface into the spacer frame over and spaced from the matrix to move the first major surface of the first sheet against the first layer, and moving a second sheet having a first major surface and an opposite major surface toward the second layer to move the first major surface of the second sheet against the second layer, wherein the first surface of the second sheet is spaced from the second surface of the first sheet to provide a compartment therebetween and the desiccant is in communication with the compartment.

A method of making an integrated window sash, including providing continuous fiber glass strand through a forming die of a pultrusion device; feeding polymeric material into a material receiver of the pultrusion device; pulling the fiber glass strand through the die as the polymeric material is formed around the strand to produce a lineal having first and second sheet supporting surfaces and a base having a surface the interconnects the first and second sheet supporting surfaces; securing a metal barrier layer to at is least the surface of the base as the lineal is formed; cutting the lineal to provide a plurality of sash members; joining the ends of adjacent sash member to provide a sash frame; applying simultaneously or in any sequence a layer of a moisture impervious adhesive sealant on the first sheet supporting surface, a layer of moisture impervious adhesive sealant on the second sheet supporting surface, and a layer of a moisture pervious matrix having a desiccant therein on the base; moving a first sheet having a first major surface and an opposite second major surface into the spacer frame over and spaced from the matrix to move the first major surface of the first sheet against the first layer, and moving a second sheet having a first major surface and an opposite major surface toward the second layer to move the first major surface of the second sheet against the second layer, wherein the first surface of the second sheet is spaced from the second surface of the first sheet to provide a compartment therebetween and the desiccant is in communication with the compartment.

DESCRIPTION OF THE INVENTION

Figure 1:
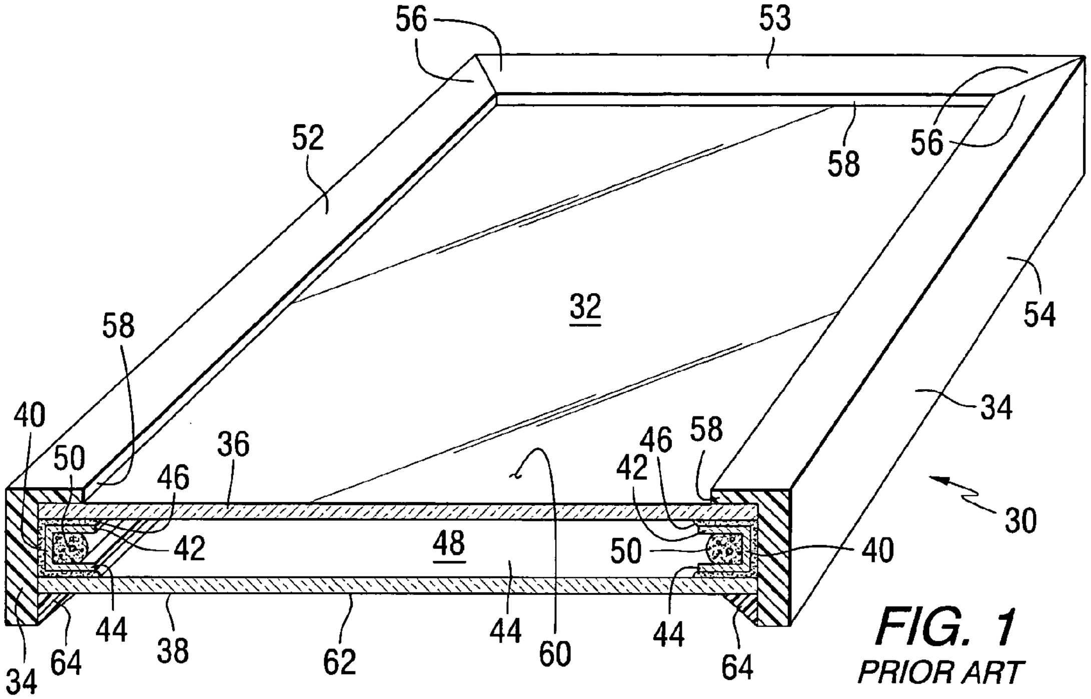
FIG. 1 PRIOR ART
FIG. 1 is an orthogonal view of a prior art window sash having an insulating viewing area, with portions removed for purposes of clarity.

As used herein, spatial or directional terms, such as “inner”, “outer”, “left”, “right”, “up”, “down”, “horizontal”, “vertical”, and the like, relate to the invention as it is shown in the drawing figures. However, it is to be understood that the invention can assume various alternative orientations and, accordingly, such terms are not to be considered as limiting. Further, all numbers expressing dimensions, physical characteristics, and so forth, used in the specification and claims are to be understood as being modified in all instances by the term “about”. Accordingly, unless indicated to the contrary, the numerical values set forth in the following specification and claims can vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques. Moreover, all ranges disclosed herein are to be understood to encompass any and all subranges subsumed therein. For example, a stated range of “1 to 10” should be considered to include any and all subranges between (and inclusive of) the minimum value of 1 and the maximum value of 10; that is, all subranges beginning with a minimum value of 1 or more and ending with a maximum value of 10 or less, e.g., 1 to 6.7, or 3.2 to 8.1, or 5.5 to 10. Also, as used herein, the terms “deposited over”, “applied over”, or “provided over” mean deposited, applied, or provided on but not necessarily in surface contact with. For example, a material “deposited over” a substrate does not preclude the presence of one or more other materials of the same or different composition located between the deposited material and the substrate.

Before discussing several non-limiting embodiments of the invention, it is understood that the invention is not limited in its application to the details of the particular non-limiting embodiments shown and discussed herein since the invention is capable of other embodiments. Further the terminology used herein to discuss the invention is for the purpose of description and is not of limitation. Still further, in the following discussion, unless indicated otherwise, like numbers refer to like elements.

Non-limiting embodiments of the invention will be discussed to fabricate a sash having two or more sheets in the enclosed open area defined by the sash frame. In the following discussion of the non-limiting embodiments of the invention, the sheets are glass sheets to make a window sash having an insulating viewing area; however, as will become apparent, the sheets can be made of any material, e.g. glass, plastic, metal and/or wood, and the selection of the material of the sheets is not limiting to the invention. Still further, the sheets can be made of the same material or the sheets may be made of different materials. In addition, one or more sheets can be monolithic sheets, and the other sheet(s) can be laminated sheet(s), e.g. made of one or more monolithic sheets laminated together in any usual manner. Although the discussion of the invention is directed to window sash, the invention is not limited thereto and the invention can be practiced to provide one or more windows having one or more sheets in a door window opening, e.g. but not limited thereto, a window opening in a front door or a patio door.

In the practice of the non-limiting embodiments of the invention, one or more of the glass sheets can be uncoated and/or coated colored and/or clear sheets; the colored sheets can be of the type disclosed in U.S. Pat. Nos. 4,873,206; 4,792,536; 5,030,593 and 5,240,886, which disclosures are hereby incorporated by reference, and one or more of the surfaces of one or of the more sheets can have an environmental coating to selectively pass predetermined wavelength ranges of light and energy, e.g. glass or plastic transparent sheets can have an opaque coating of the type used in making spandrels or coatings of the type disclosed in U.S. Pat. Nos. 4,170,460; 4,239,816; 4,462,884; 4,610,711; 4,692,389; 4,719,127; 4,806,220; 4,853,256 and 4,898,789, which disclosures are hereby incorporated by reference. Still further, in the practice of the non-limiting embodiments of the invention, the surfaces of the sheets can have a photocatalytic film or water reducing film, e.g. of the type disclosed in U.S. Pat. No. 5,873,203; U.S. Pat. No. 6,027,766; and U.S. Pat. No. 6,027,766, which disclosures are hereby incorporated by reference. It is contemplated that the photocatalytic film disclosed in U.S. Pat. No. 6,027,766 and U.S. Pat. No. 6,027,766 and/or the water reducing film disclosed in U.S. Pat. No. 5,873,203 can be deposited on the outer surface and/or the inner surface of one or more of the sheets of the window sash, as well as on the surface of the sash frame.

Prior to describing non-limiting embodiments of the invention, a discussion of a window sash having an insulating glazed unit is presented for an appreciation of the function and cooperation of the elements of the glazed unit and of the sash frame that are eliminated, combined, or modified to provide the window sash of the invention having the sheets spaced from one another by the sash frame, and optionally the space or compartment between the sheets sealed against moisture penetration and/or gas egress from the compartment. With reference to FIG. 1, there is shown a window sash 30 of the prior art having an insulating unit 32 mounted in a sash frame 34. The unit 32 includes a pair of glass sheets 36 and 38 spaced from one another by a spacer frame 40 and secured to outer surface of legs 42 and 44, respectively, of the spacer frame 40 by a layer 46 of an adhesive sealant to provide a space or sealed compartment 48 between the sheets 36 and 38. The layers 46 have a low vapor transmission or permeability and the surface of the spacer frame 40 facing the compartment 48 is gas and moisture impervious or resistant. The adhesive layers 46 and the spacer frame 40 prevent moisture from freely moving into the compartment 48 between the sheets 36 and 38. In the instance when an insulating gas, e.g. argon or krypton, is in the compartment, the layers 46 and the surface of the spacer frame 40 facing the compartment are each impervious or resistant to passage of the insulating gas to prevent egress of the insulating gas from the compartment 48.

A moisture pervious matrix 50 having a desiccant (not shown) is on the inner surface of the spacer frame 40 and communicates with the compartment 48 to absorb or adsorb moisture and selectively absorb or adsorb free volatile organic molecules in the compartment. As can be appreciated, the insulating unit 32 can have more than two sheets. For a more detailed discussion of insulating units, reference can be had to U.S. Pat. Nos. 5,177,916; 5,531,047; 5,553,440; 5,564,631; 5,617,699; 5,644,894; 5,655,282; 5,720,836; 6,115,989; 6,250,026 and 6,289,641.

The sash frame 34 usually includes four sash members (only three sash members 52, 53 and 54 shown in FIG. 1) having their ends 56 joined together in any convenient manner to form the sash frame 34 for receiving the insulating unit 32. The sash members each include a ridge or stop ledge 58 that engages marginal edge portions of side 60 the insulating unit 32 to maintain the unit in the sash frame 34. Glazing clips (not shown) engage the sash frame and the marginal edges of the other side of the insulating unit i.e. side 62 to secure the insulating unit in the sash frame. Glazing sealant 64 is provided around the marginal edge portions of the side 62 of the insulating unit 32 and adjacent portions of the sash frame 34 to prevent water from moving between the unit and the sash and for aesthetics.

The non-limiting embodiments of the invention eliminate, among other things, the spacer frame 40 that (1) functions to space the glass sheets and co-operates with the adhesive layers 46 to provide the sealed compartment 48 of the insulating unit 32, and (2) functions to provide a surface to carry the desiccant containing matrix 50. More particularly, the non-limiting embodiments of the invention discussed herein provide a sash frame that has, and/or sash members that have, among other things, the function and cooperation of the eliminated spacer frame of the glazing unit.

Figure 2:
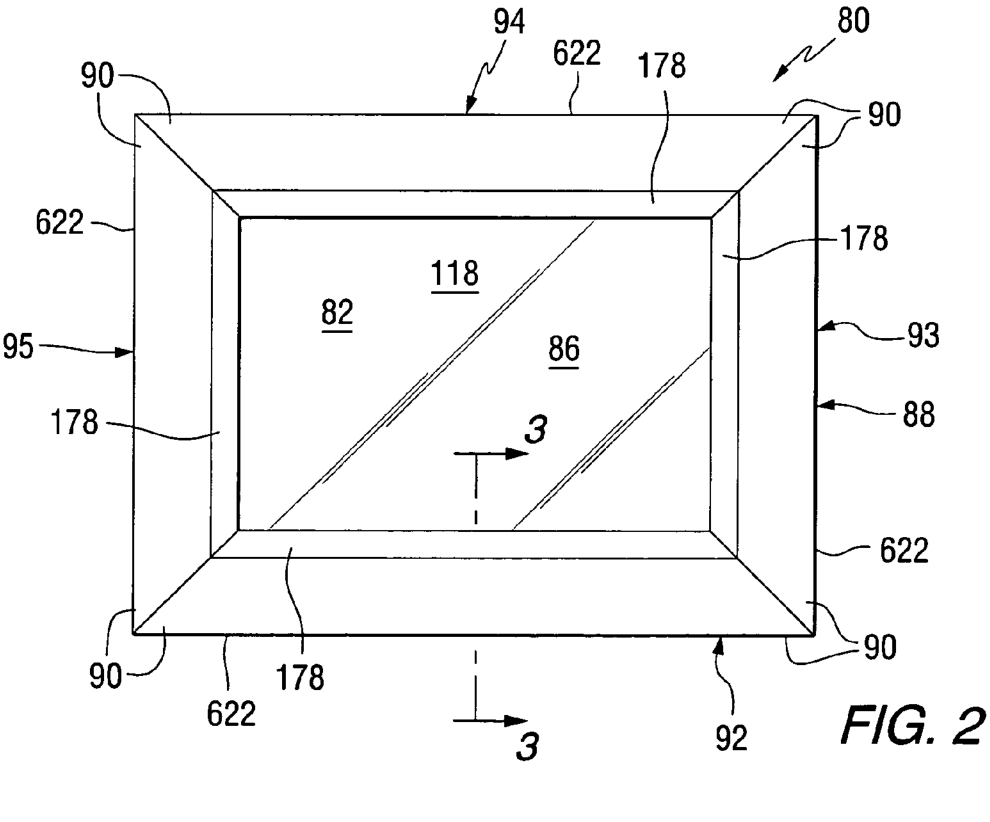
FIG. 2 is a front elevated view of an integrated window sash unit incorporating features of the invention.
Figure 3:
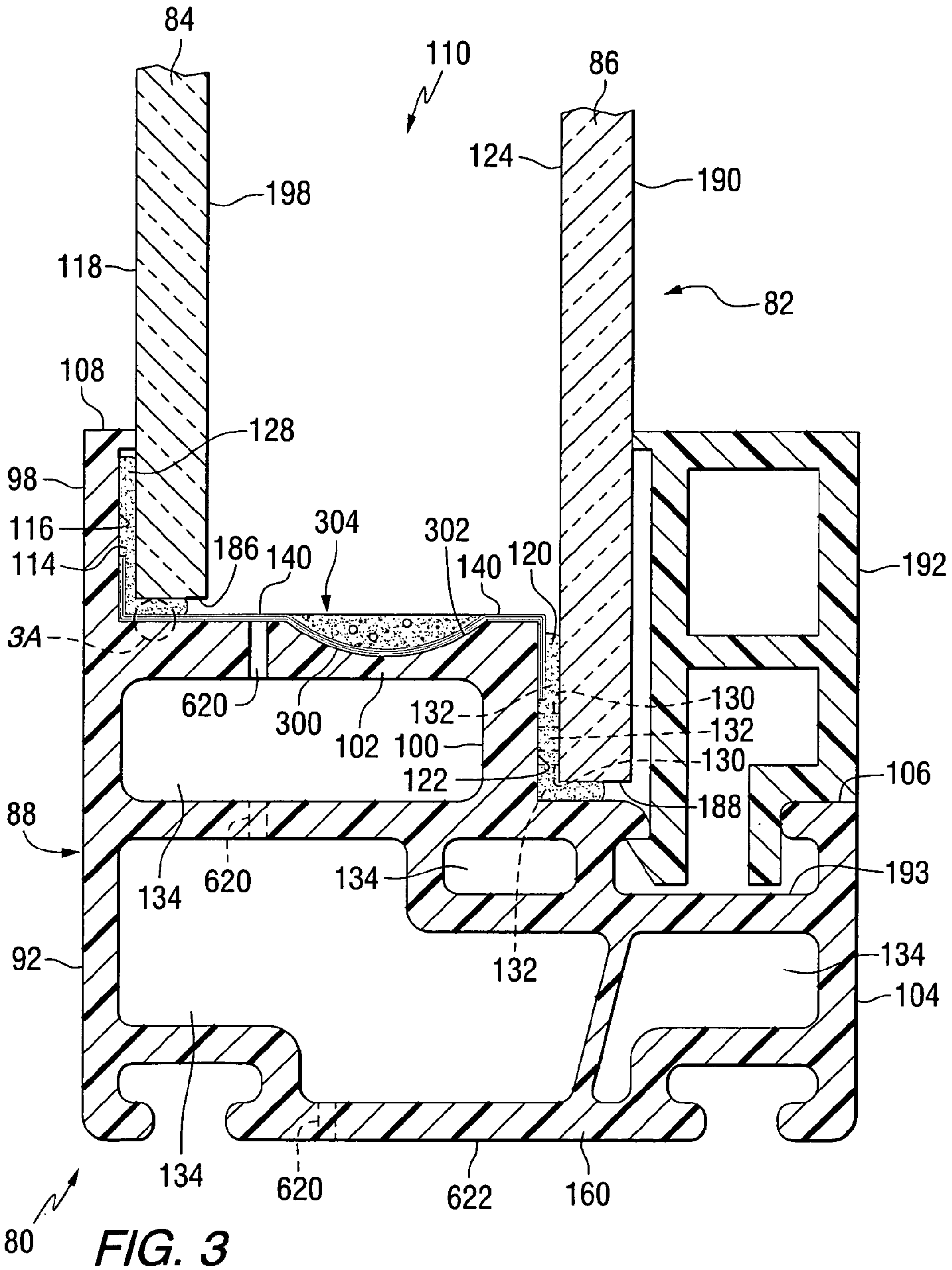
FIGS. 3 and 3A are views taken along lines 3-3 of FIG. 2.

With reference to FIGS. 2 and 3, there is shown an integrated window sash 80 having a thermally insulating viewing or vision area 82 incorporating features of the invention. The insulating vision area 82 of the window sash 80 includes a pair of sheets 84 and 86 held in spaced relation by sash frame 88 to provide the insulating viewing area 82. As can be appreciated, the peripheral shape of the sash frame 88 and the viewing area 82 is not limiting to the invention; however, for ease of discussion, but not limiting to the invention, the peripheral shape of the sash frame 88 and the viewing area 82 is shown to have a parallelepiped shape, e.g. a rectangular shape as shown in FIG. 2; however, as will become apparent from the following discussion, the invention is not limited thereto and the sash frame 88 and/or the viewing area 82 can have any peripheral shape, e.g. trapezoidal, circular, elliptical, polygon having three or more sides, a combination of linear and circular portions, a combination of linear and elliptical portions or any combinations thereof.

Figure 4:
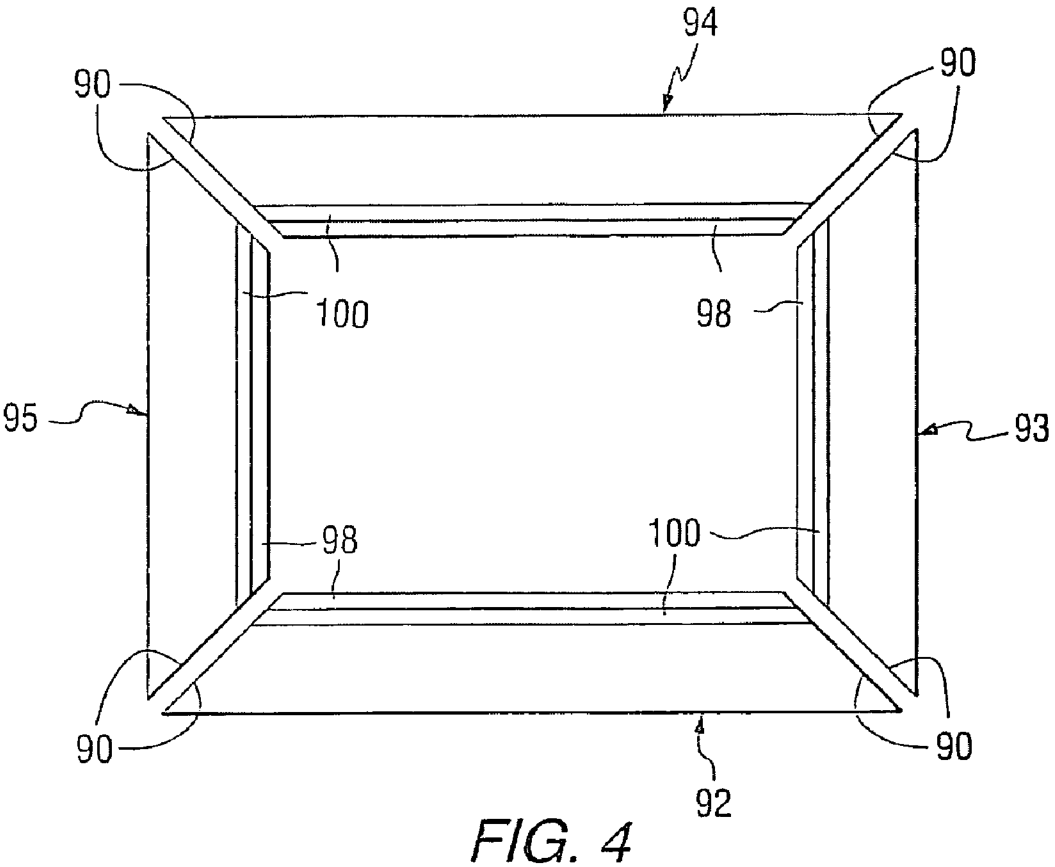
FIG. 4 is a plan view of an arrangement of sash members during fabrication of the sash incorporating features of the invention.

The sash frame 88 shown in FIG. 2 has adjacent ends 90 of the sash members or segments 92-95 joined together in any convenient manner; however, unless indicated otherwise in the following discussion of the sash frame 88, the ends 90 of the sash members 92, 93, 94 and 95 can be joined together or can be in contact with one another but not joined together. Further in the following discussion of the sash members 92-95, unless indicated otherwise, the ends of the sash members can be joined together, can be in contact with one another but not joined together or can be spaced from one another as shown in FIG. 4.

With reference to FIG. 3, the discussion is directed to the sash member 92, however, the discussion unless indicated otherwise is similarly applicable to sash members 93-95. The sash member 92 of sash frame 88 in cross section as viewed in FIG. 3 has a step-like configuration formed by walls 98 and 100 spaced apart and interconnected by base 102, and the wall 100 and outer surface 104 of the sash member 92 spaced from one another and interconnected by grooved ledge 106 discussed in detail below. The perimeter of the base 102, the perimeter of edge 108 of the wall 98, and the perimeter of the sheet 84 are sized such that with the sash frame 88 formed, the sheet 84 can be moved over the base 102 into engagement with the wall 98. The wall 98 retains the sheet 84 in the viewing area 82 of the sash frame 88. The perimeter of the base 102, the perimeter of the ledge 106 and the perimeter of the sheet 86 are sized such that with the sash frame 88 formed, the marginal edges of the sheet 86 engages the wall 100. The wall 100 prevents the sheet 86 from moving over the base 102 and spaces the sheets 84 and 86 apart to provide a space or compartment 110 between the sheets. The walls 98 and 100, and the base 102 of the sash members provide the sheet spacing function of the spacer frame 40 shown in FIG. 1.

A layer 114 of a sealant-adhesive between surface 116 of wall 98 and marginal edge portions of outer surface 118 of the sheet 84 secures the sheet 84 in place. Similarly, a layer 120 of a sealant-adhesive between surface 122 of the wall 100 and marginal edge portions of inner surface 124 secures the sheet 86 in place. Although not required and not limiting to the invention, the surfaces 116 and 122 of walls 98 and 100, respectively, can be provided with one or more slots or grooves that function as sealant reservoirs and spacers. More particularly and with referring to FIG. 3 and without limiting the present invention, the surface 116 of wall 98 has the edge 108 extending beyond the surface 116 to provide a groove 128, and the surface 122 of the wall can have a pair of spaced ribs 130 shown in phantom to provide three spaced grooves 132. The layer 114 of the sealant adhesive is applied to the surface 116 of the wall 98 to fill the groove 128, and the layer 120 of the sealant adhesive is applied to the surface 120 of the wall 100 to fill the grooves 132.

The sheets 84 and 86 are moved against their respective walls 98 and 100 against the layers 114 and 120 in the grooves 128 and 132, respectively, to provide a layer of sealant adhesive having a predetermined thickness between the sheets and their respective surfaces. In other words, the edge 108 extends beyond the surface 116 of the wall 98, and the ribs 130 extend beyond the surface 122 of the wall 100 to provide a layer of adhesive sealant in its respective groove having a predetermined depth and width to allow for biasing the sheets against their respective wall, as is discussed in more detail below, while eliminating excessive thinning of the sealant adhesive layers.

The function and cooperation of the spacer frame 34, the layers 46 and the glass sheets 36 and 38 to provide the sealed compartment 48 of the insulating glazing unit 32 shown in FIG. 1 is provided by the function and cooperation of the layers 114 and 120 of the sealant adhesive, the walls 98 and 100, and the base 102 of the sash segments 92-95 making up the sash frame 88, and the glass sheets 84 and 86 to provide the sealed compartment 110.

As can be appreciated, the invention contemplates an unsealed compartment between the sheets, i.e. a compartment in which fluid, e.g. but not limiting thereto, gas and/or vapor, e.g. moisture can move with minimal resistance into and out of the compartment 110. In this instance, the sash member can be made of any structurally sound material, e.g. the sash members maintain their shape, and are not limited to the gas and moisture resistance, i.e. moisture vapor permeability, of the material. In the preferred practice of the invention, the compartment 110 is a sealed compartment, i.e. a compartment in which movement of gas and/or moisture into and out of the compartment 110 is restricted. In the instance when the compartment 110 is a sealed compartment, the sash members can be made of any structurally sound material, and at least the surface of the base 102 of the sash members of sash frame facing the compartment 110, and the layers 114 and 120 of the sealant adhesive, are moisture resistant, i.e. have a low moisture vapor permeability, to prevent or retard the movement of moisture into the compartment 110 and/or gas impervious or resistant to prevent insulating gas, e.g. argon or krypton, from moving out of the compartment 110.

Materials that can be used in the practice of the invention to make the sash members includes, but are not limited to metal, wood, plastic, composite materials, fiber reinforced plastics and combinations thereof. Metals, e.g. but not limited to stainless steel and aluminum, are easily formed, and are moisture and gas impervious or resistant. As is appreciated by those skilled in the art, metals conduct heat from the home interior during winter and into the home interior during summer. When metal is used to fabricate the sash member, it is preferred to provide the metal sash member with a thermal break of the types usually used in the art to reduce if not eliminate the heat loss through the sash member. Wood, like metal, is easily shaped into the desired cross sectional configuration, and unlike metal is a low conductor of heat and has a high permeability to gas and moisture. The high permeability of wood permits moisture and gas to move through the wood into and/or out of the compartment between the sheets. As can be appreciated by those skilled in the art, low gas permeation rate is important to maintaining gas conditions between the glass sheets, especially if the compartment between the sheets is filled with argon or krypton. Low moisture vapor transmission rate is desirable because low moisture content or dew point of the between-sheets gas atmosphere is especially important to maintaining clear visibility through the vision area. One technique to reduce or prevent moisture moving through the wood into or out of the compartment is to provide a moisture impervious and/or resistant barrier or seal of the type discussed below. Plastic, like wood and metal, is easy to shape, and like metal can be shaped by pultrusion or extrusion. Unlike metal and like wood, plastic is a low conductor of heat; some plastics like wood have high permeability to moisture and/or gas, and some plastics unlike wood but like metals have low permeability to moisture and/or gas.

From the forgoing, it can be appreciated that in the preferred practice of the invention, the sash member is made of plastic. Types of plastic that can be used in the practice of the invention to form the sash members include but are not limited to polyvinyl chloride (PVC), acrylonitrile-butadiene-styrene (ABS), cellular PVC, polypropylene and fiber reinforced plastics. Further, as can be appreciated, the invention is not limited to any particular cross-sectional configuration of the sash members. For example, the sash members 92-95 can be solid or include hollow portions 134 as shown in FIG. 3. In one non-limiting embodiment of the invention, the hollow portions 134 can be filled with insulating material (not shown) for reduced heat transfer.

In the instance where the material of the sash member has a high gas and/or moisture vapor permeability, e.g. wood or certain plastics, a barrier layer 140 (see FIG. 3) of a material having a low gas and moisture is vapor permeability, e.g. polyvinylidene chloride (PVDC) or metal, e.g. aluminum or stainless steel, can be applied at least over surface portions of the base 102 of the sash members facing the compartment 110. Preferably, the barrier layer 140 completely covers the base 102 and extends over a portion of the surface 116 of the wall 98 and over a portion of the surface 122 of the wall 100. In this manner, an edge portion of the barrier layer 140 extends under the peripheral edges and over a portion of the marginal edges of the outer surface 118 of the sheet 84 and the opposite edge portion of the barrier layer is spaced from marginal edge portions of the inner surface 124 of the sheet 86.

As can now be appreciated, the invention contemplates applying the barrier layer 140 to all the exposed surfaces, or to selected surface portions, of the sash member, e.g. applying a barrier layer to the surfaces of the hollow sections of the sash members, especially surface portions of the hollow section opposite the base 102. The barrier layer can be applied to the sash members before or after they are joined together to form the sash frame using any applying technique, e.g. but not limited to, spraying-on, rolling on, curtain or flow coating on, brushing on a coating layer that forms the barrier layer, hot-melt extrusion of a barrier layer, cap stock and/or composite extrusion of a sash member having a barrier layer, extruding sash members with barrier inserts, e.g. but not limited to a metal strip within the plastic extrusion, gun applying a barrier layer through a shaped orifice, shrink wrapping a barrier layer film on the sash member, roll pressing a single or multi-layer tapes, e.g., but not limited to VentureClad™ 1577CW® tape available from Venture Tape Corp., Massachusetts, press rolling a pre-extruded thick tape, e.g. polyisobutylene tape having a thickness of at least 0.016 inches, applying multi layer materials to the sash member, e.g. but not limited to applying a foil then applying a polymer overcoat, applying a multi layer 2-part materials, e.g. but not limited to applying a base material then applying a catalyst material, and applying a barrier surface by surface fusion and/or infusion of nano-barrier materials such as nano-particles. In addition, the invention contemplates preparing the surface of the sash member by secondary processes as known by those skilled in the art, e.g. but not limited to, corona surface treatment of polyvinyl chloride to enhance adhesion of the barrier layer, applying a physical vapor deposition of inorganic barrier material, e.g. aluminum oxide, silicon oxide and mixtures of multi-layers thereof, ultraviolet cure mechanisms, e.g. but not limited to ultraviolet cure of organo-metallic barrier layers and ultrasonic cure mechanisms to further enhance barrier layer properties. As an alternative and/or in addition to using a barrier layer to reduce the moisture vapor transmission rate performance and gas permeation performance of the sash, the thickness of selected critical web portions of the sash members can be increased, e.g. but not limited to the base 102 of the sash members.

As can be appreciated the invention is not limited to the material of the barrier layer. For example, the barrier layer can be made of any material that has a low moisture vapor permeability, i.e. less than 0.1 grams per square meter per day (hereinafter "gm/M$^2$/day", for example less than 0.05 gm/M$^2$/day) as determined by using the procedure of ASTM F 372-73, and more particularly, in the range of 0.01-0.10 gm/M$^2$/day, preferably in the range of 0.02-0.05 gm/M$^2$/day, and more preferably in the range of 0.025-0.035 gm/M$^2$/day. As can be appreciated for metal barrier layers the permeability is 0 gm/M$^2$/day. In the instance when the compartment contains an insulating gas, e.g. but not limited to argon, the barrier layer should have a low gas permeability, e.g. less than 5%/yr and for argon preferably 1%/yr, as measured using European procedure identified as DIN 52293. Barrier films can be made from, but not limited to, films made of metal, crystalline polymeric material including, but not limited to polyvinylidene chloride, polyvinyl alcohol, ethylene vinyl alcohol, polyacrylonitrile, polyethylene naphthalate, oriented polypropylene, liquid crystal polymer, oriented terephthalate, polychloro-fluoro-ethylene, polyamide 6, polyvinylidene fluoride, polyvinyl chloride or polytrichlorofluoro ethylene and copolymers thereof, and other plastic materials meeting the above requirements. More particularly, barrier films can be made from, but not limited to films made of metal and polymeric materials including, but not limited to: thermoplastics such as acetal resins (polyoxymethylene), acrylic resins (acrylonitrile-methyl acrylate copolymer), cellulosic plastic, fluoroplastics (fluoropolymer, ethylene-chlorotrifluoroethylene copolymer (ECTFE), ethylene-tetrafluoroethylene copolymer (ETFE), fluorinated ethylene-propylene copolymer (FEP), perfluoroalkoxy resin (PFA & MFA), polychlorotrifluoroethylene (PCTFE), polytetrafluoroethylene (PTFE), polyvinyl fluoride (PVF), polyvinylidene gluoride (PVDF), hexafluoropropylene, tetrafluoroethylene, ethylene (HTE), tetrafluoroethylene, hexafluoropropylene, vinylidene fluoride, terpolymer (THV)), ionomers, parylenes, polyamides (Amorphous Nylon, Nylon 6-PA6, Nylon 66-PA 66, Nylon 6/66-PA 6/66, Nylon 6/12-PA 6/12, Nylon 6/6.9-PA 6/69, Nylon 6.6/6.10-PA 66/610), polyamide nanocomposites, polycarbonates, polyesters (polybutylene terephthalate (PBT), polyethylene napthalate (PEN), polycyclohexylenedimethylene terephthalate (PCTG), polycyclohexylenedimethylene ethylene terephthalate (PETG), polyethylene terephthalate (PET), liquid crystal polymer (LCP)), polyimides, polyolefins (Ultra low density polyethylene (ULDPE), low density polyethylene (LDPE), linear low density polyethylene (LLDPE), medium density polyethylene and linear medium density, polyethylene (MDPE & LMDPE), high density polyethylene (HDPE), polyolefin plastomers (POP), cyclic olefin copolymer (COC), ethylene-vinyl acetate copolymer (EVA), ethylene-acrylic acid copolymer (EAA), polypropylene (PP), polybutene, polybutylene (PB)), polyphenylene sulfides, polysulfones, polyvinyl alcohol, styrenic resins (acrylonitrile-butadiene-styrene copolymer (ABS), acrylonitrile-styrene-acrylate copolymer (ASA), polystyrene (PS), oriented polystyrene (OPS), general purpose polystyrene (GPPS), high impact polystyrene (HIPS), styrene-acrylonitrile copolymer (SAN), ethylene-vinyl alcohol copolymer (EVOH), styrene-butadiene block copolymer (SBS)), and vinyl resins (polyvinylidene chloride (PVDC), polyvinylidene chloride coated films (PVDC) coated polyester films); thermosets such as epoxy resins; thermoplastic elastomers such as olefinic thermoplastics elastomers, polyether block amides, polybutadiene thermoplastic elastomer, polyester thermoplastic elastomer, styrenic thermoplastic elastomer, and vinyl thermoplastic elastomers, and rubbers such as butadiene rubber, butyl rubber, bromobutyl rubber, chlorobutyl rubber, polyisobutylene rubber, chlorosulfonated polyethylene rubber, epichlorohydrin rubber, ethylene-propylene rubber, fluoroelastomer (vinylidene fluoride-hexafluoropropylene copolymer), natural rubber, neoprene rubber, nitrile rubber, polysulfide rubber, polyurethane rubber, silicone rubber, styrene-butadiene rubber. The invention is not limited to the thickness of the barrier film, however the film should be sufficiently thick to provide the desired resistance to movement of moisture and/or gas through the film. For example, but not limited thereto, a 0.001 inch (0.00254 centimeter) thick aluminum film or a polyvinylidene chloride film in the thickness range of 0.005-0.60 inches, preferably in the range of 0.010-0.040 inches, and more preferably in the range of 0.020-0.030 inches meets the requirements discussed above.

The instant invention also contemplates having a sash member whose body is made entirely from a polymeric material having a low moisture vapor permeability such as, but not limited to, the crystalline polymeric material and/or from making the sash member by modifying the material used to make the sash members to improve its moisture and/or gas permeation performance. In one non-limiting embodiment of the invention, the mixtures include but are not limited to blending liquid crystal polymers with PVC and nano-meter scale platelets, e.g. but not limited to, aluminum silica platelets.

As can be appreciated by those skilled in the art, the surface portion of the sash frame and the moisture impervious or resistant adhesive sealant of the layers 114 and 120 should be compatible, i.e. the adhesive must adhere to and not chemically react with the sash frame and barrier layer. In one non-limiting embodiment, the sash member is PVC and a crystalline polymeric material barrier layer or a metal barrier layer is applied completely over the surface of the base 102 and extending about 0.125 to 0.25 inches onto the surface 114 of the wall 98 and onto the surface 122 of the wall 100. Optionally, the metal barrier layer can extend further over, or completely cover the surface 114 of the wall 98 and/or the surface 122 of the wall 100.

In the following discussion and not limiting to the invention, the invention is discussed using a barrier layer made of crystalline polymeric material. As is appreciated by those skilled in the art, crystalline polymeric materials have a lower thermal conductivity than metals, e.g. aluminum or stainless steel and therefore are preferred, but not limited to the practice of the invention.

As can be appreciated by those skilled in the art, crystalline polymeric materials do not readily adhere to PVC surfaces and therefore an adhesive layer is used to adhere the layer of crystalline polymeric material to selected surfaces of the PVC sash members or the PVC sash frame. The adhesive layer may consist of any one of a number of adhesives such as, but not limited to, ethyl vinyl acetate. In one non-limiting embodiment, molten ethyl vinyl acetate resin and a molten crystalline polymer resin, e.g. but not limited to the invention polyvinylidene chloride resin, are extruded in any convenient manner to provide a molten barrier layer and thereafter PVC molten resin and the barrier layer are co-extruded to provide a sash lineal having a PVC body with at least the base 102 covered with the barrier layer. It is well recognized that crystalline polymeric materials can deteriorate as a result of exposure to ultraviolet radiation. Therefore, the surface of the barrier layer should be protected against ultraviolet radiation.

In a non-limiting embodiment of the invention, barrier layers made of plastic that deteriorate when exposed to ultraviolet radiation, e.g. but not limited to the crystalline polymeric barrier layer, can be protected by providing the sheets facing the sun, e.g. the sheet 86 with an ultraviolet coating or a glass sheet that absorbs ultraviolet radiation, e.g. a glass with cerium or titanium as taught in U.S. Pat. Nos. 5,240,886 and 5,593,929, which patents are hereby incorporated by reference. In another non-limiting embodiment of the invention, an adhesive film, e.g. ethyl vinyl acetate is applied on each of the major surfaces of the crystalline polymeric material. For example but not limited to the invention, crystalline polymeric resin, e.g. polyvinylidene chloride is fed into the center orifice of an extruder and molten ethyl vinyl acetate resin fed into orifice of the extruder on each side of the center orifice to extrude a barrier layer having a polyvinylidene chloride layer between and adhered to a pair of ethyl vinyl acetate layers, e.g. as disclosed in Japanese Patent Application JP 1-128820, which application is hereby incorporated by reference. The three layer tape and molten PVC resin are extruded together to provide a sash lineal having the three layer barrier layer on at least the base 102 of the sash member or the sash frame. In another non-limiting embodiment of the invention, the surface of the crystalline polymeric material of the barrier layer is covered with a desiccating medium as discussed below. In a still further non-limiting embodiment of the invention, the solar control glass, the three layer barrier layer and the desiccating medium are all used together.

Figure 3A:
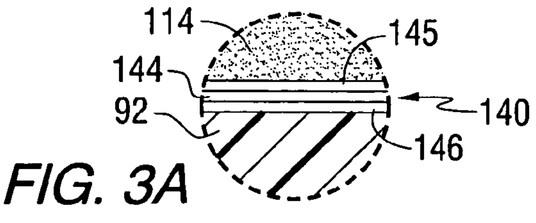

In the preferred practice of the invention, but not limited thereto, and it is preferred to simultaneously extrude a three layer barrier layer (a polyvinylidene chloride layer 144 between and adhered to a pair of ethyl vinyl acetate layers 145 and 146, see FIG. 3A) on a PVC lineal such that the barrier layer covers the base and selected portions of the surfaces 114 and 122 of the walls 98 and 100, respectively, as discussed above. The thickness of the adhesion layer 146 is not limiting to the invention but should be sufficiently thick to secure the barrier layer 140 to the selected surface portions of the sash member and the adhesion layer 145 should be sufficiently thick to provide ultraviolet protection to the polyvinylidene chloride layer, e.g. thicknesses in the range of greater than 0 and less than 0.003 inches are acceptable, with a thickness of up to 0.002 inches preferred and a thickness range of 0.0005 to 0.001 inches most preferred. The dimensions of the sash member are not limiting to the invention, however the dimensions should be sufficient to provide a sash member that is structurally stable and sized for the intended use of the sash member, e.g. to make a sash frame of predetermined dimensions.

The adjacent ends 90 of the sash members 92-95 can be joined in any manner to provide a sash frame 88 having corners sealed against moisture penetration when the window sash 80 is to have a sealed compartment 110. In the instance when the window sash 80 is to have an unsealed compartment 110, the corners of the sash frame do not have to be sealed. With reference to FIGS. 3 and 4, as required, the sash members 92-95 have mitered ends 90 and the general cross section of the sash members is as shown in FIG. 3. The mitered ends 90 of adjacent sash members 92-93, 93-94, 94-95 and 95-92 are moved into contact with one another and held together in any usual manner, e.g. by nails, screws, adhesive, fusion welding, vibration welding, etc.

Figure 5:
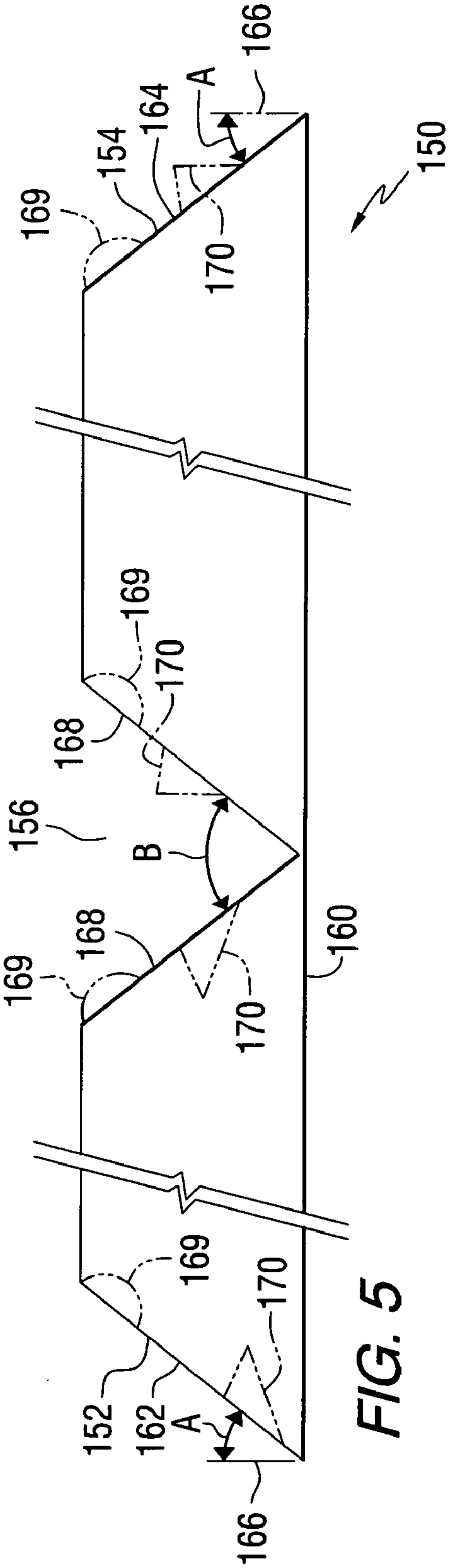
FIG. 5 is a side view of a continuous sash member lineal having mitered end and notched cutout sections.

As an alternative to assembling the sash frame 80 from a plurality of discreet sash members 92-95, the sash frame 80 can be made from a single lineal cut from a piece of extrusion, e.g. but not limiting to the invention, a PVC extrusion. More specifically, shown in FIG. 5 is a lineal 150 of sash material cut to the length of the sash frame periphery. A cut is made at both ends 152 and 154 of the lineal 150 and intermediate notched cutouts 156 (only one shown in FIG. 5) are made at locations between the ends 152 and 154 depending on the configuration of the sash frame. For example, if the sash frame includes "X" number of sides, and therefore there are "X" corners, the lineal 150 will have "X−1" notched cutouts 156. The intermediate cutouts 156 are made so as to not cut through the back web 160 (see also FIG. 3) of the lineal 150, so as to leave an uncut piece of extruded sash around the entire unit, with the exception of the closure corner. In this manner, the web is continuous at and around each of the corners where the lineals is notched. The use of multiple notched cutouts along the length of the lineal 150, is not limiting to the invention and the number can be of whatever number is needed to form the desired shape of the sash frame. The angles of the cutouts 156 along the length and the end 152 and 154 of the lineal 150 are adjusted to fit the desired angles at the corners of the sash frame. The lineal 150 is then folded at the cutouts 156, and the ends 152 and 154 and the intermediate cut outs 156 are joined, for example by welding, bonding, adhering, or external fastening. It should be appreciated that viewing the assembled sash frame would indicate continuous web and the previous separation of the other components of the lineal due to the notched cutouts.

To form a square or rectangle, a cut is made at both ends 152 and 154 of the lineal 150 such that surface 162 of the end 152 and surface 164 of the end 154 are at an angle A of approximately 40 to 45 degrees to an imaginary line 166 normal to the plane of the back web 160, and three intermediate notched cutouts 156 (only one shown in FIG. 5) made at locations between the ends 152 and 154 with sides 168 of the cutouts forming an angle B of approximately 80 to 90 degrees. In another non-limiting embodiment of the invention, the sash frame 88 is square or rectangular, surface 162 of the end 152 and surface 164 of the end 154 each subtend an angle A in the range from 40 to 43 degrees, and the surfaces 168 of the three intermediate cutouts 156 (only one shown in FIG. 5) form an angle B in the range from 80 to 85 degrees, to make certain that extra material, if needed in the welding process, will be available at each joint formed by the meeting of the surfaces 162 and 164 of the ends 152 and 154, respectively, and the surfaces 168 of the cutouts 156 to ensure that the interior of the sash frame 88 is properly sealed. Additional advantages of not cutting through the back web 160 of the sash lineal 150 is that the alignment of adjacent corners during the corner bonding process is maintained, and the sash frame is faster to fabricate than traditional fabrication using individual sash members.

It should also be appreciated that the surfaces 162 and 164 of the ends 152 and 154, respectively, and the surfaces 168 of the cutouts 156 are not limited to a straight edge as shown in FIG. 5. More particularly, in one non-limiting embodiment of the invention, these surfaces are shaped, for example scalloped (imaginary line 169) or step (imaginary line 170) as shown in phantom in FIG. 5, to complement each other so that as the lineal 150 is bent the surfaces 162 and 164 of the ends 152 and 154, respectively, and the surfaces 168 of the cutouts 156, move into contact with one another, fit together and enmesh to construct the completed sash frame 88.

Although not limiting to the invention, during the sash frame assembly and welding operation, in addition to or in place of the extra material provided at the welded joints as discussed above, an additional piece of weldable material (not shown) can be inserted between the opposing surfaces 162 and 164 of the ends 152 and 154, respectively, and the surfaces 168 of the cutouts, as the sash frame is formed and the joints are welded. The additional piece provides additional material at the joints to further seal the joints of the sash frame and ensures airtight welded joints. Although not limiting to the invention, the additional piece can be a flat piece of stock made from the same material as the extruded lineal.

Figure 6:
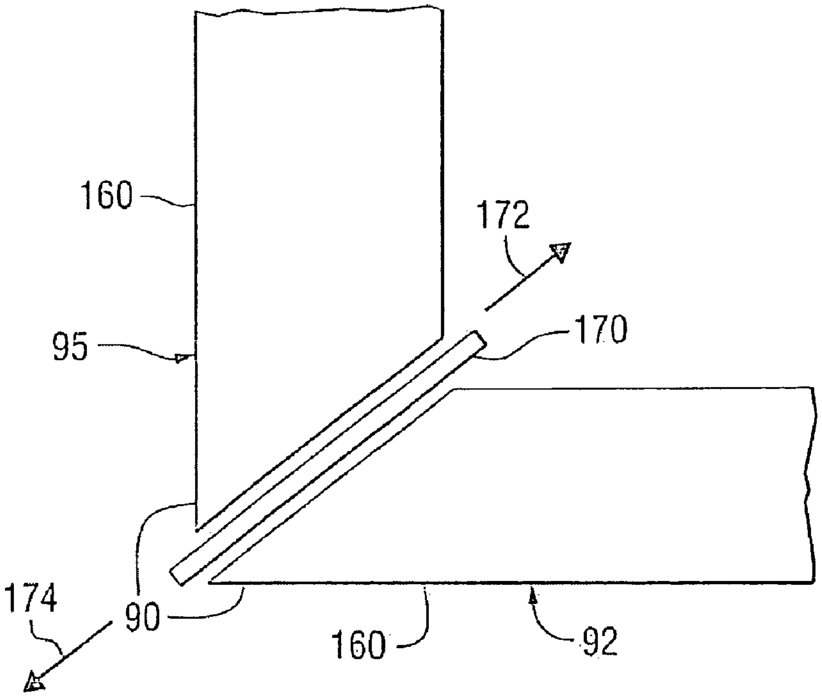
FIG. 6 is a partial plan view of an arrangement to heat ends of sash members to join the ends to make a sash frame.
Figure 7:
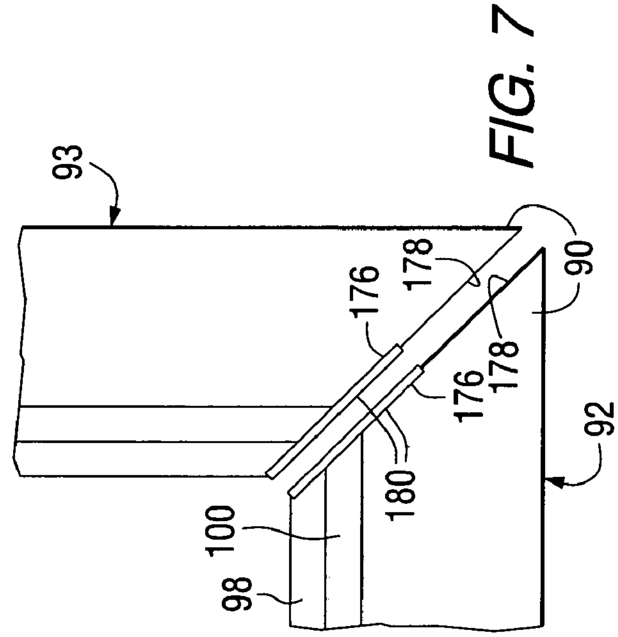
FIG. 7 is a partial plan view and an exposed view illustrating a technique for sealing corners of a closed sash frame.

The invention is not limited to the process for joining the ends 90 of adjacent sash member 92-95, and any convenient process that provides sealed joints can be practiced. With reference to FIG. 6 and not limiting to the invention, a heatable plate 170 is positioned between the ends 90 of adjacent sash members 92-95, e.g. ends 90 of sash members 92 and 95 as shown in FIG. 6. The heatable plate 170 is heated and after the melting temperature of the ends 90 of the sash members 92 and 95 is reached and the ends of the adjacent sash members starts to soften, the plate 170 is removed, and the ends of the adjacent sash members are moved together to join the ends. When the barrier layer is plastic, ends of adjacent sash members are moved together, to join the sash members including the plastic barrier layer. Optionally, the ends of adjacent sash members can be moved together and moved along a reciprocating path designed by the arrows 172 and 174 (see FIG. 6). Excess plastic flows out from the surfaces to the sash member. After the sash frame is formed, excess melted plastic is removed in any convenient manner, e.g. but not limiting thereto by air abrasion from all surfaces except for the joined ends of the barrier layer. With reference to FIG. 7, another non-limiting embodiment of the invention to seal the corner is to provide the barrier layer on the base as previously discussed and to mill a recess 176 in surface 178 of each end 90 of each one of the sash members 92-95 (only ends 90 of the sash members 92 and 93 shown in FIG. 7). A layer 180 of a material having a low vapor and gas permeability, e.g. a polyisobutylene tape or any of the adhesive-sealants discussed above, is placed in the recess 176. As the ends of the mitered sash members are brought together, the layers 180 are urged together to form a moisture and/or gas impervious seal around the peripheral and marginal edges of the sheets. It should be appreciated that this technique can be use in any type of assembly method, for example but not limited to those assembly methods discussed above. The invention further contemplates providing strips of moisture impervious or resistant thermoset or thermoplastic adhesive sealant between the ends 90 of adjacent sash members, and heating the adhesive sealant in any convenient manner to flow the adhesive sealant and seal the joining ends of the sash members.

In another embodiment of the invention, the ends of adjacent sash members are joined together in any convenient manner, e.g. but not limiting to the invention, by screws or adhesives, and a patch of a low moisture and gas permeability tape or tapes is applied to and pressed onto the barrier layer 140 on the base 102 and overlapping the corners of the sash frame. The tape can be a film of the barrier layer 140 (see FIG. 3) applied to the base, or can be a film of a material having a low moisture permeability bonded to a film of a material having low gas permeability. The adhesive for bonding the tape to the base can be the same type used to adhere the barrier layer to the PVC, e.g. ethyl vinyl acetate.

With reference to FIGS. 1, 2 and 3 as needed, the sash frame 88 having the sealed corners, the barrier layer 140 on the base 102 and portions of the surfaces 116 and 122 of the walls 98 and 100, respectively, replaces the spacer frame 34 of the glazing unit 32 shown in FIG. 1, and provides the function of the spacer frame maintaining the glass sheets spaced from one another to provide a sealed compartment between the sheets. The surfaces 116 and 120 of the walls 98 and 100, the glass sheets 84 and 86, and the layers 114 and 120 of the sealant adhesive cooperates with one another to provide the sealed compartment 110.

The layers 114 and 120 of the adhesive sealant used to secure the glass sheets 84 and 86 to the surfaces 116 and 122 of the walls 98 and 100 of the sash frame 88 or sash members 92-95 are a moisture and vapor resistant adhesive-sealant of the type used in the art of making insulating glazing units to prevent moisture from the environment or atmosphere from moving into the compartment between the sheets. Although not limiting to the invention, in one non-limiting embodiment of the invention, the material for the layers 114 and 120 of the adhesive-sealant can be made of any material that has a low moisture vapor permeability, i.e. less than 0.1 gm/$M^2$/day, for example less than about 0.05 gm/$M^2$/day, as determined by using the procedure of ASTM F 372-73, and more particularly, in the range of 0.01-0.10 gm/$M^2$/day, preferably in the range of 0.02-0.05 gm/$M^2$/day, and more preferably in the range of 0.025-0.035 gm/$M^2$/day. In the instance when the compartment contains an insulating gas, e.g. but not limited to argon, the layers 114 and 120 should have a low gas permeability, e.g. less than 5%/yr, and for argon preferably 1%/yr measured using the European procedure identified as DIN 52293. Adhesive-sealants that can be used in the practice of the invention include, but are not limited to, butyls, silicones, polyurethane adhesives, polysulfides, and butyl hot melts. Further, the material of the adhesive-sealant is selected depending on the insulating gas in the compartment 110, e.g. argon, air, krypton, etc. to maintain the insulating gas in compartment 110.

The layers 114 and 120 of the adhesive sealant can be applied to the surfaces 116 and 122 of the walls 98 and 100 in any convenient manner, and can be applied to the sash members 92-95 or to the sash frame 88. In the practice of the invention, the smaller glass sheet 84 is placed in the sash frame opening and pressed against the layer 114 of the adhesive sealant to flow the adhesive sealant and secure the glass sheet 84 to the wall 98 of the sash frame 88. Thereafter, the larger glass 86 is placed against the layer 122 of the adhesive sealant and pressed against the layer 122 of the adhesive sealant to flow the adhesive sealant and secure the glass sheet 86 to the wall 100 of the sash frame 88. The adhesive sealant can be applied only to the marginal edges of the sheets, to the peripheral edges of the sheets or to the marginal and peripheral edges of the sheets. In the practice of the invention, it is preferred to apply the layers of the adhesive sealant to the surfaces 116 and 122 of the walls 98 and 100, portions of the base 102 adjacent the wall 98 and portions of the grooved ledge 106 such that the adhesive sealant is applied to the marginal edges of the outer surface 118 and peripheral edges 186 of the glass sheet 84, and to the marginal edges of the inner surface 124 and the peripheral edges 188 of the glass sheet 86 as shown in FIG. 3. In this manner, the peripheral edge 186 of sheet 84 can be supported and maintained in spaced relationship from base 102 and the peripheral edge 188 of sheet 86 can be supported and maintained in spaced relationship from the portion of the grooved ledge 106 as shown in FIG. 3.

As can be appreciated the glass sheets can be positioned within the sash frame in any convenient manner, for example, but not limiting thereto, the glass sheets can be positioned in the sash frame manually, or using automated equipment. For example but not limit the invention thereto, the sash frame can be mounted in a horizontal position, vertical position or angled position. A major surface of the glass sheet 84 is engaged by a sheet engaging device, e.g. but not limited to vacuum cups, and the sheet moved is against the layer 114 of the adhesive sealant to flow the adhesive sealant layer and seal the marginal edges of the sheet to the wall 98. In the alternative, a roller (not shown) is moved over the marginal edges of the inner surface 198 of the sheet 84 to flow the layer 114 of the adhesive sealant. Thereafter, the sheet-engaging device engages a major surface of the glass sheet 86, and moves the sheet 86 against the layer 120 of the adhesive sealant. The sheet is pressed against the layer 120 to flow the adhesive sealant and/or a roller (not shown) is rolled over the marginal edges of outer surface 190 to flow the adhesive sealant. The outer or inner major surface of the sheets 84 and 86 can be engaged, however, in the practiced of the invention, it is preferred to engage the outer major surface 118 of the sheet 84 and outer major surface 190 of the sheet 86 for ease of cleaning the sheet surfaces in the event the sheet engaging device mars the sheet surfaces. After the sheet 86 is in place, a holding component 192, for example as shown in FIG. 3, is snapped or otherwise inserted into a groove or grooves 193 in the ledge 106 of the sash frame 88 and engages the marginal edge portions of the surface 190 of the sheet 86 to firmly hold and/or bias the sheet 86 against the layer 120 of the adhesive sealant. The holding component 192 can also be used to provide a balance to the widow sash by making the height of opposed sides of the window sash substantially equal.

As can be appreciated, the dimensions of the surfaces of the sash members 92-95 as viewed in cross section (see cross section of sash member 92 shown in FIG. 3) and the length of the sash members are not limiting to the invention, and a general relationship is discussed for an appreciation of the invention. As viewed in FIG. 3, the height of walls 98 and 100 are generally in the range of 0.125 to 1.0 inches (0.32 to 2.54 centimeters ("cm")). The width of the base 102, i.e. the distance between surface 116 of wall 98 and surface 122 of wall 100, depends on the desired spacing between sheets 84 and 86 and the sheet thickness. Without limiting the present invention, the glass sheet thickness in conventional insulating glass units typically ranges from 0.09 to 0.250 inches (2.2 to 6.35 millimeters ("mm")). The distance between the glass sheets is not limiting to the invention; however, it is desirable that the distance be sufficient to provide an insulating gas space or compartment 110 between the sheets 84 and 86 while minimizing, if not eliminating, gas currents from forming in the compartment 110. As is appreciated by those skilled in the art, the distance between the sheets 84 and 86 depends on the type of gas in the compartment 110. Without limiting the present invention, the spacing between sheets 84 and 86 typically ranges from 0.25 to 1.0 inches (0.64 to 2.54 cm). For example, a distance in the range of 0.25 to 0.625 inches (0.63 to 1.58 cm) is typical for air.

As discussed above, the glass sheet 86 is biased against the layer 120 of adhesive sealant by the glass holding component 192. As can be appreciated, the glass holding component 192 provides a mechanical biasing force against the outer marginal edges of the surface 190 of the glass sheet 86. The glass sheet 84 as shown in FIG. 3 relies on the adhesive strength of the layer 114 of the adhesive sealant to secure the glass sheet 84 in position. In an embodiment of the invention wherein sheet 84 is the outer sheet of the window sash, it is expected that the outer surface 118 of the glass sheet 84 will be exposed to the outside environment, and therefore, it is necessary to select an adhesive sealant having sufficient strength to withstand historical wind loads or pressures. As can be appreciated, the invention contemplates using a mechanical retaining device to bias the sheet 84 against the layer 114 of the adhesive sealant, or at least prevent the marginal edge of glass sheet 84 from separating from adhesive layer 114.

Referring to FIG. 8, there is shown non-limiting embodiments of retaining devices or retainers to hold and/or bias the sheet 84 firmly against the layer 114 of the adhesive sealant applied to the wall 98. As can be appreciated, the invention is not limited to the retainers shown in FIG. 8, which are shown for purposes of illustration and not for purposes of limitation. In FIGS. 8A-8C, there is shown non-limiting embodiments of retainers of the invention that are integral with the sash members 92-95 (only sash member 92 shown in FIGS. 8A-8C), and in FIG. 8D-8J there is shown non-limiting embodiments of retainers of the invention that are detachably secured to the sash members after the sheet 84 is in position, and before the sheet 86 is put in position, as previously discussed.

Figure 8A:
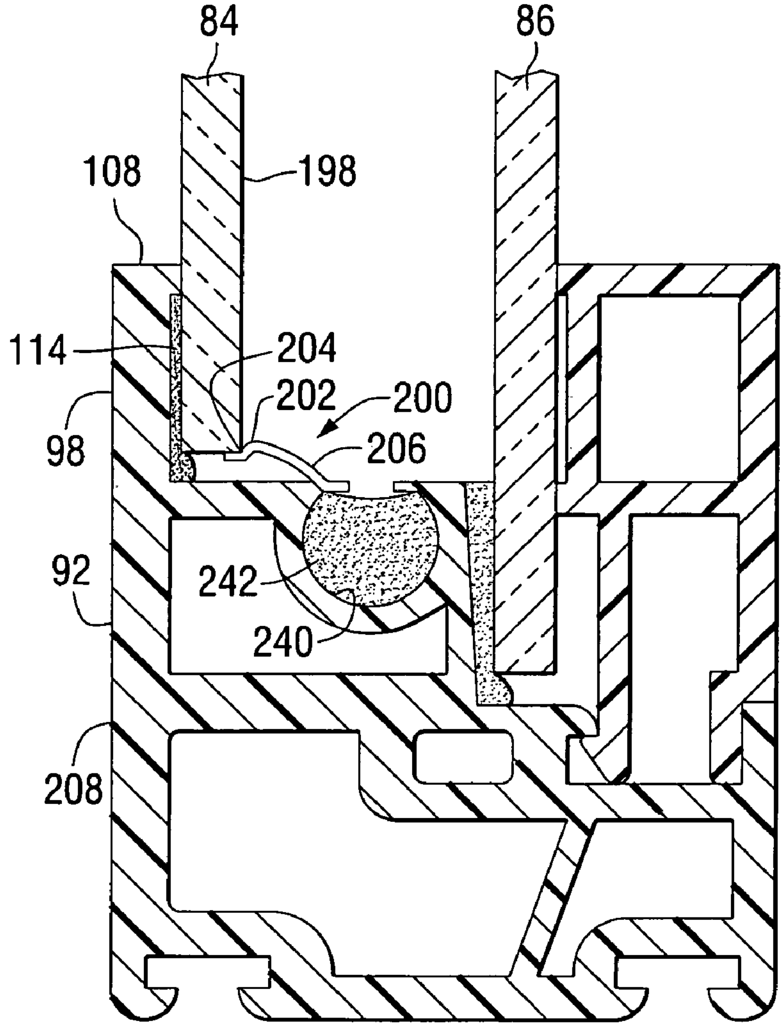
FIG. 8 is sectional views A through K of a sash member incorporating different embodiments of a retainer clip of the present invention.
Figure 8B:
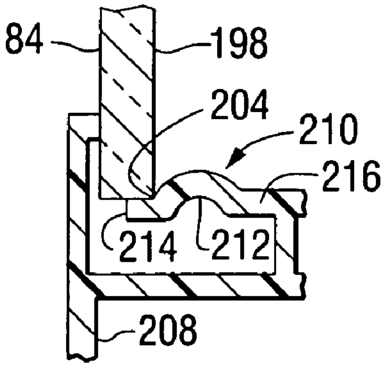
Figure 8C:
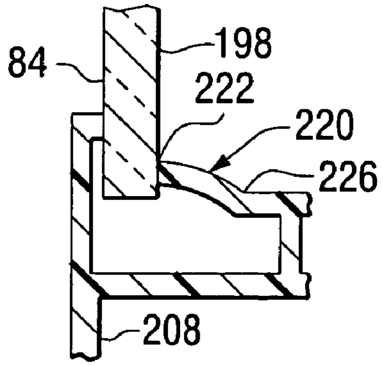

Each embodiment of the retaining device or retainer shown in FIG. 8A-8J includes a flexible fin or finger having a sheet engaging portion that contacts at least inner surface 198 of the glass sheet 84 and biases the sheet 84 against the layer 114 of adhesive sealant on the wall 98. With reference to FIG. 8A, retainer 200 is a flexible finger or fin having a stepped end portion 202 to engage corner 204 of the sheet 84 and opposite end portion 206 of the retainer 200 is integral with body 208 of the sash members. Retainer 210 shown in FIG. 8B is a flexible fin or finger having a raised portion 212 that provides a stepped end portion 214 to engage the corner 204 of the sheet 84. The opposite end 216 of the retainer 210 is integral with the body 208 of the sash member. Retainer 220 shown in FIG. 8C is a flexible finger or fin having end portion 222 biased against marginal edge portions of inner surface 198 of the sheet 84 and opposite end portion 226 integral with the body 208 of the sash members. The retainers 202, 210 and 220 of FIGS. 8A, 8B and 8C, respectively, are a continuous retainers that can be extruded along with the sash member. These retainers can be the same material as the remainder of the sash member or could be a separate, non-integral co-extruded material, for example with a different durometer than the sash member. In one non-limiting embodiment of the invention, the retainers have a lower durometer than the main body 208 of the sash member 92-95. In the practice of the invention, as the sheet 84 is moved into the sash frame toward the wall 98, the sheet 84 engages the retainer 200, 210 or 220 and biases it out of the path of the sheet 84. After the sheet 84 is biased against the layer 114 of the adhesive sealant, the retainer 200, 210 or 220 moves to its initial position to bias the sheet toward the wall 98 against the layer 114.

Figure 8D:
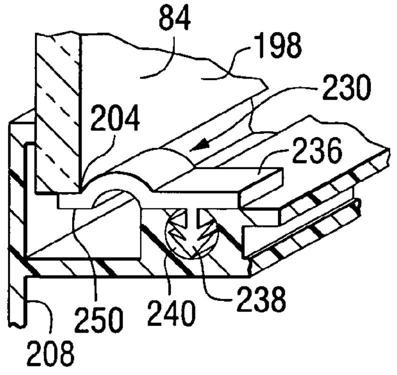
Figure 8E:
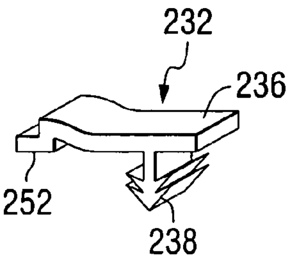
Figure 8F:
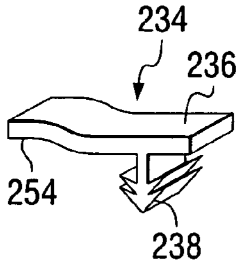

FIGS. 8D-8J illustrate several similar retainer configurations that function the same as the retainers described above and shown in FIGS. 8A-8C, but they are clip-type, non-continuous inserts that can be installed into the body 208 of the sash members 92-95 before or after the sheet 84 is in position against the layer 114 of the adhesive sealant. Each retainer shown in FIGS. 8D-8J can be continuously or intermittently applied. The portion of the clips that secures it to the body of the sash member can have a variety of attachment designs as shown in FIGS. 8D-8J. More specifically, retainers 230, 232 and 234 shown in FIGS. 8D-8F, respectively, are a "push-in" type clips having the non-glass-retaining portion of the retainer inserted into the body 208 of the sash member. Each of the retainers 230, 232 and 234 has an end portion 236 having an engaging member 238. The engaging member 238 as shown in FIGS. 8D-8F is of the type commonly referred to as a "Christmas Tree" but can be any other type of interlocking devices. The engaging member 238 is commonly referred to as a "Christmas Tree" because the shape of the engaging member looks very much like a fir tree and in the industry is called a "tree" or "Christmas tree". With reference to FIG. 8D, the tree 238 is pushed into a groove 240 in the base 102, between the walls 98 and 100, of the sash members 92-95. To securely hold the tree 238 in the groove 240, the groove can be filled with an adhesive (not shown). In one non-limiting embodiment, the adhesive can be a moisture impervious adhesive having a desiccant, which is discussed in more detail below. End portion 250 of the retainer 230 shown in FIG. 8D is similar to the end portion 214 of the retainer 210 shown in FIG. 8B; end portion 252 of the retainer 232 shown in FIG. 8E is similar to the end portion 202 of the retainer 200 shown in FIG. 8A, and end portion 254 of the retainer 234 shown in FIG. 8F is similar to the end portion 222 of the retainer 220 shown in FIG. 8C. When the retainers of FIG. 8D-8F are set in position before the sheet 84 is in position, the engaging end portion 236 should be secured in the groove 240 to prevent the engaging end portion 236 of the retainers 230, 232 and 234 from moving out of the groove 240 as the sheet 84 moves over the retainer toward the wall 98.

Figure 8G:
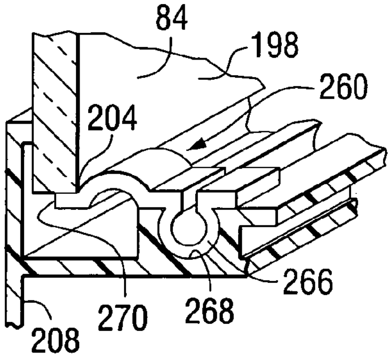
Figure 8H:
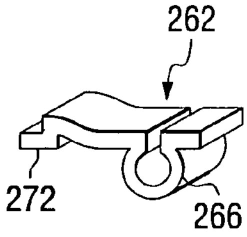
Figure 8I:
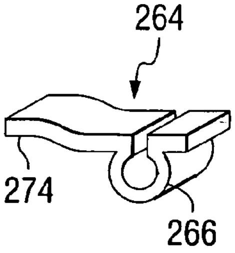

The retainers 260, 262 and 264 shown in FIGS. 8G-81 are a "slide-in" type clips having non-glass-retaining end portion 266 of the retainer slid into a mating groove 268 in the sash members, e.g. see FIG. 8G. Although not limiting to the invention, the groove 268 and the retaining end portion 266 are sized to capture the end portion 266 in the groove 268 when the retainers are set in the groove. In such a case, it is required to insert the retaining end portion 266 of the retainers 260, 262 and 264 in the groove 268 before the sash members are joined together. End portion 270 of the retainer 260 shown in FIG. 8G is similar to the end portion 214 of the retainer 210 shown in FIG. 8B; end portion 272 of the retainer 262 shown in FIG. 8H is similar to the end portion 202 of the retainer 200 shown in FIG. 8A, and end portion 274 of the retainer 264 shown in FIG. 8I is similar to the end portion 222 of the retainer 220 shown in FIG. 8C.

Figure 8J:
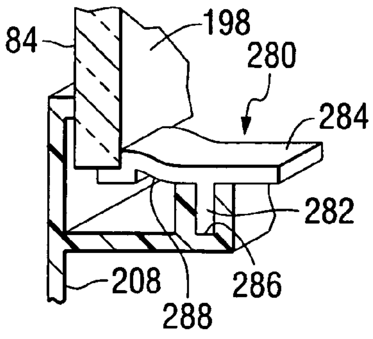

Retainer 280 shown in FIG. 8J has a flat-sided tab 282 extending from end portion 284 that is inserted into a flat-sided groove 286 in the body 208 of the sash member after the glass sheet 84 is in position. In the instance when the tab 282 is in the groove 286 before the sheet 84 is in position against the wall 98, the tab 282 is retained in the groove by an interference fit. Sheet engaging end portion 288 of the retainer 280 is similar to the stepped end 202 of the retainer 200 shown in FIG. 8A. The invention, however, is not limited thereto and the sheet engaging end portions 212 and 222 of the retainers 210 and 220 can be used by the retainer 280 shown in FIG. 8J.

Figure 8K:
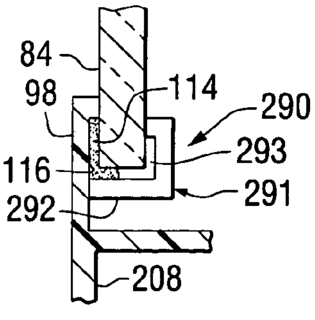

Retainer 290 shown in FIG. 8K includes an “L” shaped leg 291 having one leg 292 mounted to wall 98 and forms a groove 293 with the surface 116 of the wall 98 to receive the edge of the sheet 84. The retainer 290 is flexible and is moved toward base 102 as the sheet 84 is positioned on the layer 114. After the sheet is positioned on the layer 114 of the sealant adhesive the retainer 290 is released to its original position so that leg 292 moves over the marginal edges of the inner surface of the sheet 84. Although not shown, the invention contemplates using a retainer 290 to engage the sheet 86 in a similar manner.

It can now be appreciated that in those non-limiting embodiments of the invention when the retainer is positioned on the body of the sash member before the sheet 84 is positioned on sash frame 88, as the glass sheet 84 moves over the retainer toward the layer 114 of the adhesive sealant on the wall 98, the retainers flex outwardly relative to the sash frame and springs back to its initial position after the sheet has passed or is aligned with the sheet engaging portion of the retainers.

As can be appreciated, a retainer of the type discussed above can also be incorporated into the sash members 92-95 to bias sheet 86 against the wall 100. This arrangement could eliminate the need for the glass holding component 192 to secure the glass sheet 86 in place.

In the practice of the invention, when the compartment 110 (see FIG. 3 is a sealed compartment, it is preferred to provide a desiccant in communication with the interior of the compartment to absorb or adsorb moisture captured in the sealed compartment 110 during manufacture and/or shipment of the unitless window sash. The invention is not limited to the manner in which the compartment communicates with the desiccant nor is the invention limited to the type of desiccant used. For example, the desiccant can be loose particles contained in a porous tube or a desiccant contained in a moisture pervious adhesive, e.g. of the type disclosed in U.S. Pat. Nos. 5,177,916; 5,531,047 and 5,655,280. The disclosure of the patents is hereby incorporated by reference. In the preferred practice of the invention, the desiccant is provided in the compartment between the sheets.

In one non-limiting embodiment of the invention, the desiccant is incorporated into a moisture impervious matrix to form a desiccating medium 304 that is applied to surface 302 of base 102. As can now be appreciated, when the perimeter defined by the desiccating medium 304 on base 102 is smaller than the perimeter of the glass sheet 84 (see FIG. 11), in order to avoid the edges of the sheet 84 contacting the desiccating medium 304 as the sheet 84 passes over the medium, the desiccating medium is applied to the base after the sheet 84 is in position in the sash frame.

As an alternative and with reference to FIG. 3, a channel 300 can be formed in surface 302 of the base 102 to receive the desiccating medium 304. The size of the channel 300 is not limiting to the invention, and the channel can be any length, depth, width and/or configuration to accommodate more or less of the desiccating medium 304. In this manner, the peripheral edge of sheet 84 will not contact the desiccating matrix 304 as the sheet is position on the sash frame.

Shown in FIG. 9 are additional non-limiting embodiments of the invention for containing the desiccating medium 304 and allowing for the medium to be applied before the sheet 84 is moved into place. As can be appreciated the invention is not limited to the arrangements for containing the desiccating medium shown in FIG. 9, which are shown for purposes of illustration and not for purposes of limitation.

Figure 9A:
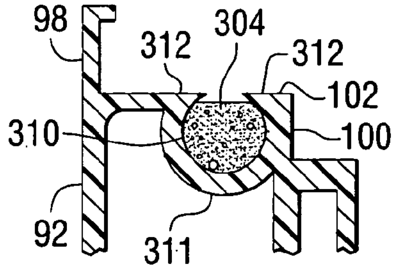
FIG. 9 is sectional views A through J of alternate desiccant reservoir configurations.

More specifically, FIG. 9A shows the desiccating medium 304 in a round cavity 310 in the base 102 of the sash members 92-95 (only sash member 92 shown in FIG. 9). The rounded cavity 310 reduces the amount of desiccant visible when looking through the vision area of the window sash. The invention contemplates having sides 312 of the opening of the cavity 310 with a different durometer than the base 102 so that a nozzle can be inserted into the cavity for rapid filling, as will be discussed later. In addition, the rounded outer bottom surface 311 reduces the surface area exposed to the atmosphere as compared to a flat outer bottom, e.g. as shown in FIG. 9E, and therefore, the desiccant in the cavity having the rounded outer bottom is expected to have a longer life than desiccant in a cavity having a flat outer bottom.

Figure 9B:
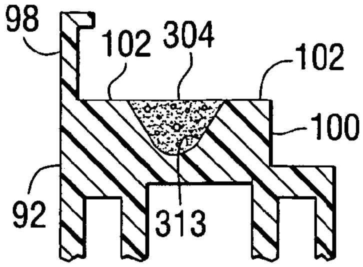
Figure 9C:
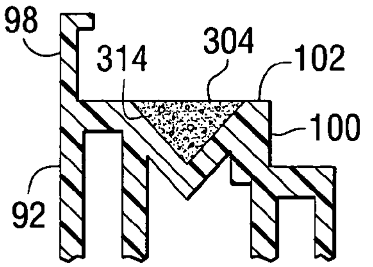

FIG. 9B shows the desiccating medium 304 in a curvilinear shaped groove 313 formed in the base 102 of the sash members. The curvilinear shape of the groove allows for easier application of a barrier coat on the base 102 of the sash member. FIG. 9C shows the desiccating medium in a “V” shaped channel 314. Because of the open upward end of the channel 314, the use of nozzle tips of various shapes could be accommodated for varying the rate at which the desiccating medium can be applied to the channel 314. This design also lends itself to easy application of barrier layer.

Figure 9D:
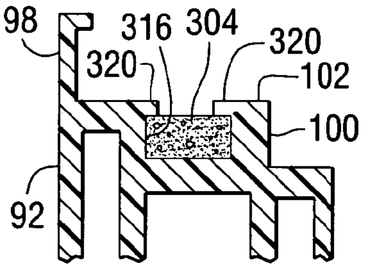
Figure 9E:
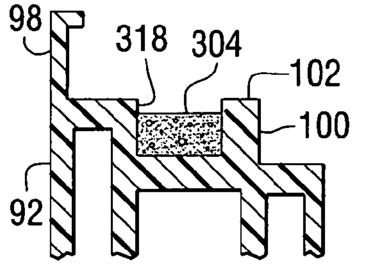
Figure 9F:
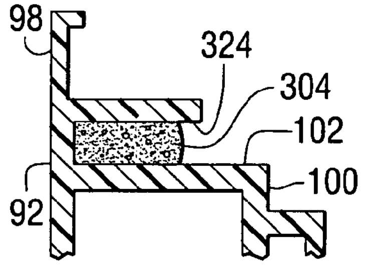
Figure 9G:
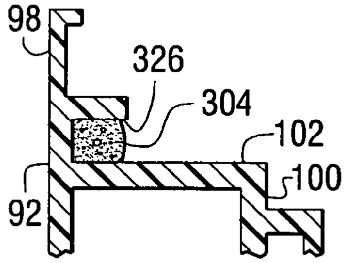
Figure 9H:
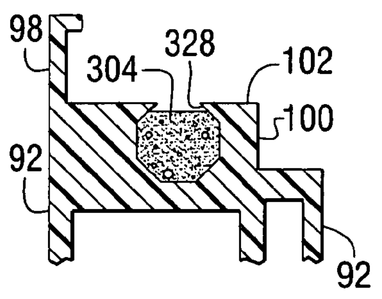

FIGS. 9D and 9E show the desiccating medium 304 in a generally “U” channel 316 and 318, respectively. The channel 316 shown in FIG. 9D incorporates flaps 320 on the topside of the channel which allow insertion of a nozzle into the channel 316 and lowers the amount of visible desiccant. The channel 318 shown in FIG. 9E does not incorporate the flaps 320 thereby allowing the entire width of desiccant to be seen. FIGS. 9F and 9G show the desiccating medium 304 in side pockets 324 and 326, respectively. The orientation of the pockets 324 and 326 allows for the use of extruding nozzle tips to all be oriented in the same direction, e.g. when applying the layers 114 and 120 of adhesive sealant to the walls 98 and 100, and applying the desiccating medium 304 in the pockets 324 and 326. As can be appreciated the depth of the pockets 324 and 326 are not limiting to the invention and can be any depth to hold varying amounts of desiccating medium, e.g. the side pocket 324 shown in FIG. 9F is deeper than side pocket 326 shown in FIG. 9G, and will hold more desiccating medium than the pocket 326. The pocket depth is a factor to be considered when the volume of the compartment increases. For example, but not limiting to the invention, more desiccating medium is required for a patio door than for a window. The pockets 324 and 326 shown in FIGS. 9F and 9G, respectively, also provide a means of hiding the desiccating medium 304, making a more aesthetically pleasing window. FIG. 9H shows the desiccating medium 304 in a channel 328 having an interior faceted configuration that allows for greater capacity than the rounded channel 310 shown in FIG. 9A and also reduces surface tension of the desiccant.

Figure 9I:
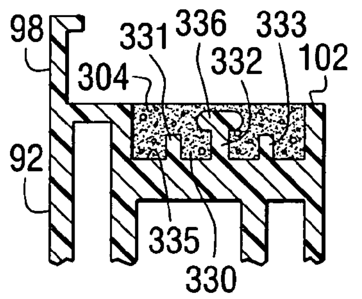

The cavity 330 shown in FIG. 9I has a plurality of upright members 331-333. The upright members are provided to secure the matrix containing the desiccant (see FIG. 3) in the cavity 335 until it solidifies. In the event that the matrix does not readily adhere to the surface of the base 102 the upright 333 is provided with a rounded end 336 to secure the matrix in the cavity 335.

Figure 9J:
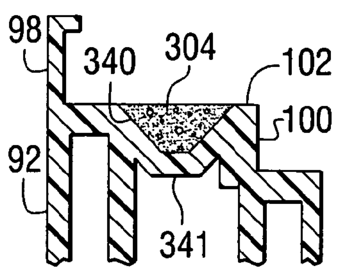

FIG. 9J is similar to FIG. 9C except that the cavity 340 has a flat bottom 341. The flat bottom is preferred when using pop rivets of the type used in the art to seal vent holes and holes for moving insulating gas into the compartment 110 (see FIG. 3). As can be appreciated, the base 102 can have the barrier layer 140 as discussed above and shown in FIG. 3.

FIG. 8 illustrates an embodiment of the invention that combines a desiccant cavity as shown in FIG. 9A with a sheet retaining device as discussed earlier.

As is appreciated by those skilled in the art, when a window having a sealed compartment filled with gas is transported to a higher altitude from a lower altitude and vice versa, e.g. moving from valleys to mountains, the pressure of the gas in the compartment is different from the gas acting on the outer surface of the glass sheets. When the difference is significant, a separation of the marginal edges of the sheets from its respective layer of adhesive sealant may occur. To maintain the difference between the gas pressure in the compartment and the gas pressure acting on the outer surfaces of the sheets at a minimum, vent holes or breather holes connecting the interior of the compartment to the environment are provided. The breather tubes can be left open so as to equalize the gas pressure inside the compartment 110 to the pressure outside the compartment when moving the window sash 80 from a low altitude to a higher altitude and vice versa. Once the unit arrives at its final destination, if desired the vent holes can be used to move a desired gas into the compartment and thereafter, the vent holes are sealed to retain the gas within the compartment. For a detailed discussion of breather tubes reference can be made to Glass Technical Document TD-103 published by PPG Industries Inc., which document is incorporated herein by reference. The vent holes, unlike breather tubes, are usually opened as needed to equalize the pressure in the compartment to the pressure acting on the outer surfaces of the glass sheets.

Figure 10A:
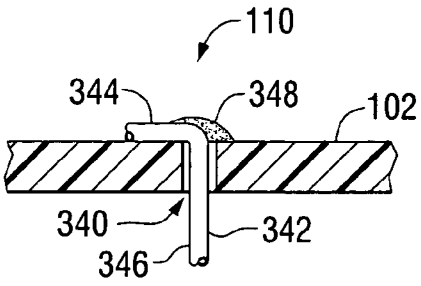
FIG. 10 is side views A through H of alternate vent hole configurations.
Figure 10B:
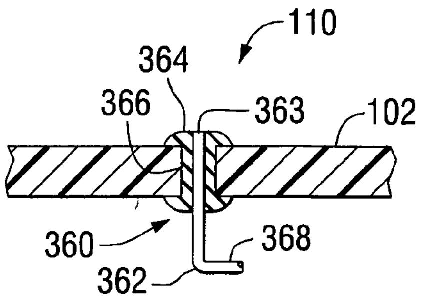
Figure 10C:
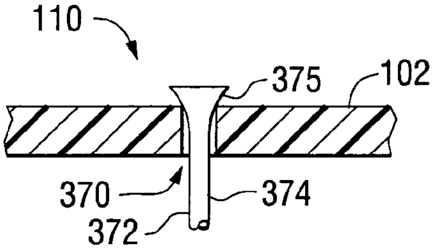

FIGS. 10A-10C and FIG. 11 illustrate several different breathe tube designs and FIGS. 10D-10H illustrate several different vent hole designs that can be used in the present invention. As can be appreciated the invention is not limited to the breather tubes or vent holes shown in FIGS. 10 and 11 which are shown for purposes of illustration and not for purposes of limitation. Breather hole 340 shown in FIG. 10A includes a hollow conduit 342 having end portion 344 inserted in the base 102 of a sash member into the compartment 110. Conduit 342 has a 90 degree bend to move the end portion 344 of the conduit against the base as shown in FIG. 10A. The end portion 344 of the conduit 342 can be secured to the base 102 with sealant, glue, or other attachment material 348. End portion 346 is accessible to fill the compartment 110 with an insulating gas and/or to seal the end portion 346, e.g. by crimping the end of the conduit 342 and putting adhesive over the crimped end of the conduit to prevent gas from moving into or out of the compartment. Breather hole 360 shown in FIG. 10B includes a conduit 362 having end portion 363 inserted into a pop rivet 364 mounted in hole 366 in base 102. Opposite end portion 368 of the conduit 362 extends away from the base and can be used to fill the compartment with an insulting gas and is sealed as discussed above to maintain the gas in the compartment 110. Breather hole 370 shown in FIG. 10C includes a conduit 372 in hole 374 in the base 102. The conduit 372 has a flared end 375 pushed into the hole 374 in the base 102 of the sash member so that the flared end retains the tube in the sash member. Optionally a sealant can be use to secure the flared end 375 in the hole.

Figure 11:
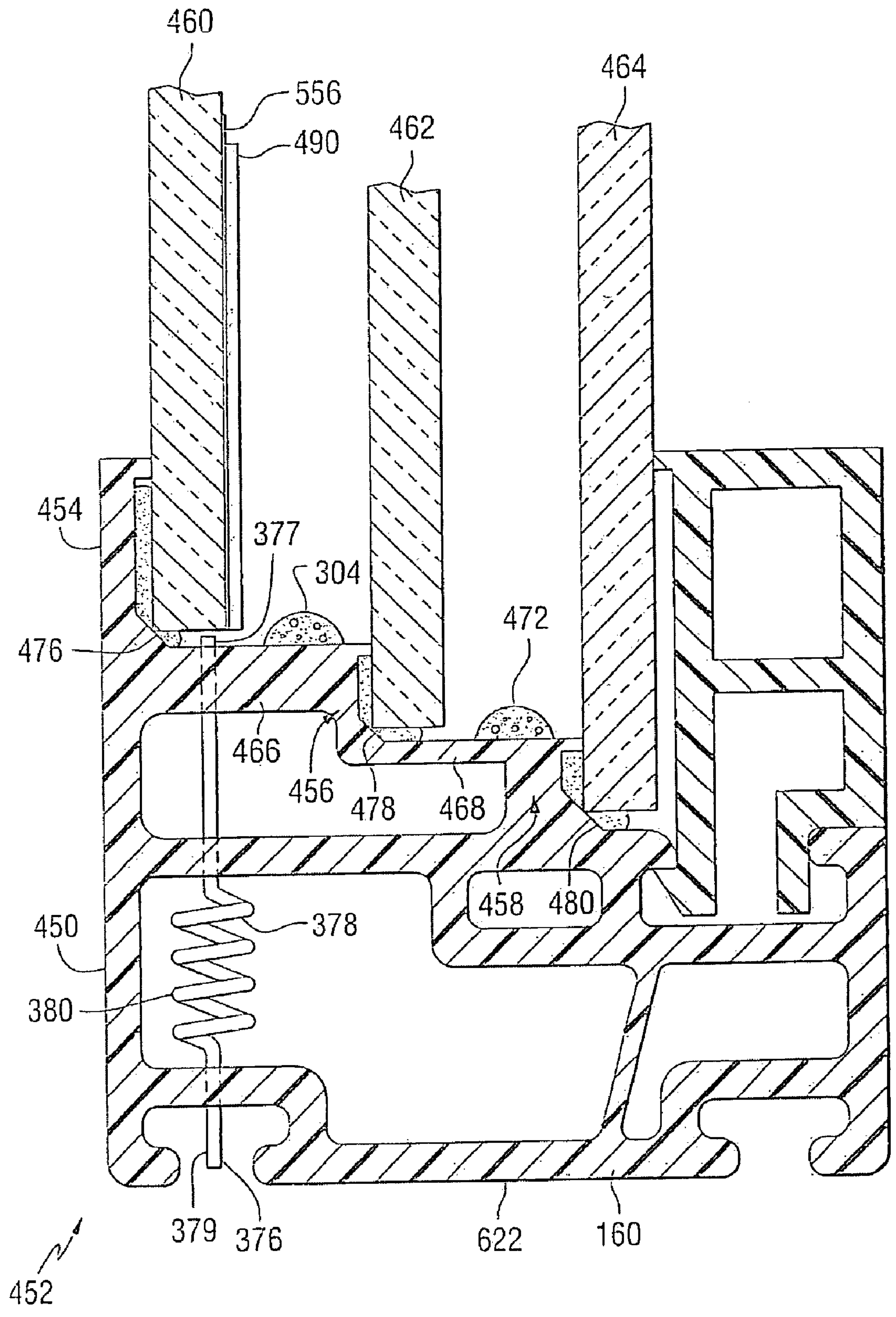
FIG. 11 is a view similar to FIG. 3 illustrating a glazing unit incorporating three glass plies.

With reference to FIG. 11, breather tube 376 has one end 377 of conduit 378 in the compartment between the glass sheets 460 and 462. The conduit 378 extends through the body of the sash member 450 and has opposite end 379 extending out of the body of the sash member 450. The portion 380 of the conduit 376 between its ends 377 and 379 is bent to the shape of a spring to accommodate the 12 inches or more of conduit in the confined space of the sash member. After the integrated window sash reaches its destination, the end 379 is crimped and adhesive sealant provided over the crimped end.

Figure 10D:
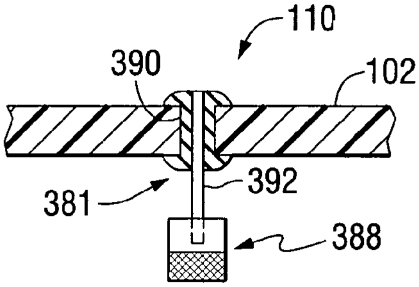
Figure 10E:
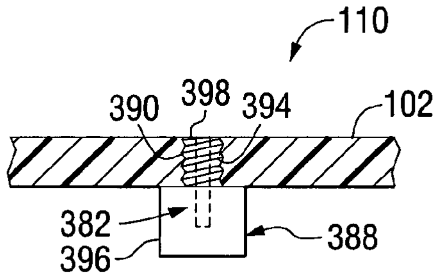

The venting holes 381 and 382 of FIGS. 10D and 10E, respectively, include a desiccated breather module 388 combined with a hole 390 in the base 102. The desiccated breather module 388 is not intended to replace the desiccating medium of the compartment 110, but functions to remove moisture in the air moving from the environment into the compartment 110. The module 388 can be connected to a conduit 392 as shown in FIG. 10D or a threaded connection 394 as shown in FIG. 10E having an end portion in the hole in the base 102 of the body of the sash member and the other end connected to a canister 396 of module 388 having a desiccant therein. A screw 398 is threaded into the threaded connection 394. Rotating the screw in one direction provides communication between the outside environment through the canister to vent the compartment 110 and rotating the screw in the opposite direction seals the compartment against the environment after the pressure in the compartment has equalized to the pressure outside the chamber. The desiccant inside the canister 396 provides added drying capacity. Also, the canister can be replaced from time to time to replenish the desiccant drying power.

Figure 10F:
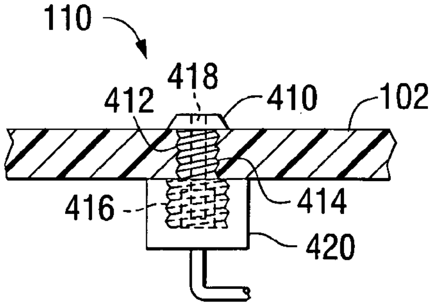
Figure 10G:
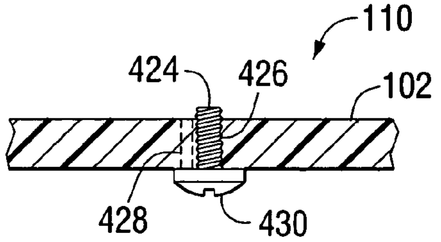
Figure 10H:
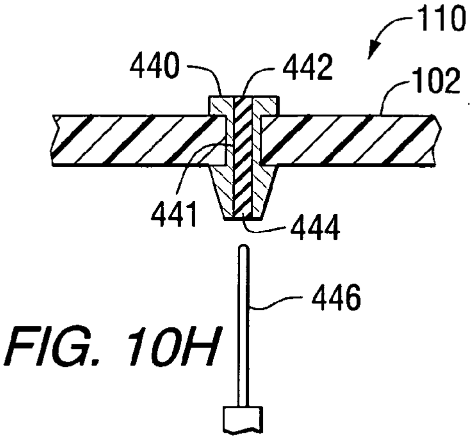

FIGS. 10F and 10G illustrate mechanical venting methods. FIG. 10F includes a double threaded plug 410. The first, smaller threaded portion 412 is screwed into a hole 414 in the base 102 of the sash member, and the second, larger threaded hole portion 416 extends beyond the base of the sash member. A through hole 418 goes through the center of the plug 410 to vent the gas in the compartment 110. Once equilibration has been established, a cap 420 is screwed onto the larger threaded portion of the plug 416 to seal the vent hole. FIG. 10G shows a screw 424 threaded into hole 426 in the base 102 of the sash member. A second hole 428 is positioned in close proximity to the hole 426 such that head 430 of screw 424 extends beyond hole 428. When screw 424 is loosened, air can pass through hole 428 into the compartment 110. When screw 424 is tightened, the screw head 430 seals the hole 428, and the compartment 110. Optionally a gasket can be provided under the screw head 430 to enhance the sealing of the compartment 110. FIG. 10H shows a pop-rivet 440 in hole 441 in the base 102 of the sash member; the pop-rivet 440 has a hollow body 442 which is filled with a SANTOPRENE plug 444 or other self sealing membrane. To vent the compartment 110, the plug 444 is pierced, e.g. with a hypodermic needle 446, allowing pressure equalization of the gas in the compartment 110 with the atmosphere. When the needle 446 is extracted from the plug 444, the membrane self-heals sealing the compartment 110. As an alternative, the entire plug can be a resilient, self-sealing material.

In the discussion regarding the non-limiting embodiments of the breather holes and vent holes shown in FIG. 10, a hole was provided in the base 102 of the sash member to provide communication with the interior of the compartment 110. As can be appreciated; the invention is not limited thereto and communication with the interior of the compartment 110 can be made at different locations on the window sash, e.g. but not limited to a hole in one or more of the glass sheets.

As can now be appreciated, the invention is not limited to the number of sheets of the insulating unitless window sash of the invention. For example and with reference to FIG. 11, each sash member 450 of sash frame 452 includes walls 454, 456 and 458 for receiving peripheral and marginal edges of sheets 460, 462 and 464. Walls 460 and 462 are separated by base 466 and walls 462 and 464 are separated by base 468. The desiccating medium 304 can be provided on the base 466 between the sheets 460 and 462, and optionally, a bead 472 can be provided on base 468 between sheets 462 and 464. As can be appreciated, the sheet 462 can be a glass sheet or a plastic sheet having an environmental coating of the types taught in the art to increase the insulating value of the unitless window sash or can be a decorative panel such as those used in art glass applications.

Although not limiting to the invention, and with continued reference to FIG. 11, in one non-limiting embodiment of the invention, sash members, e.g. sash member 450 shown in FIG. 11 can include glass-centering ramps 476, 478 and 480 located at the bottom portion of the walls 454, 456 and 458, respectively. The glass centering ramps are essentially chamfers that are extruded (for vinyl sash) or milled (for wood sash) along at least a portion of each sash member, and in one non-limiting embodiment, along the entire length of each sash member. The ramps allow the glass sheets 460, 462 and 464 to be dropped into place during assembly, while restricting lateral movement. By allowing the glass to slide down the ramp, the glass is centered with minimal effort. As can be appreciated the ramps shown in FIG. 11 can be used with the sash members 92-95 discussed above. As can be further appreciated, the retainer devices shown in FIG. 8 and discussed above can be used to retain the sheets 460 and 462 in position. Further the vent holes shown in FIG. 10 and discussed above can be used to equalizing the pressure in the space between adjacent sheets 460 and 462 and adjacent sheets 462 and 464 when transporting the unitless sash from one altitude another different altitude.

Figure 12:
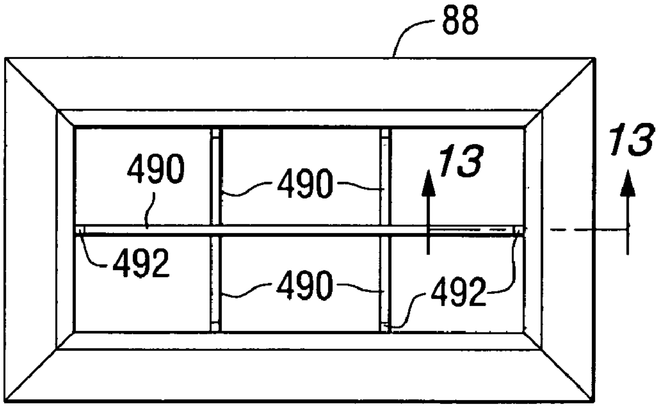
FIG. 12 is a view similar to FIG. 2 illustrating an integrated window sash unit incorporating muntin bars.
Figure 13:
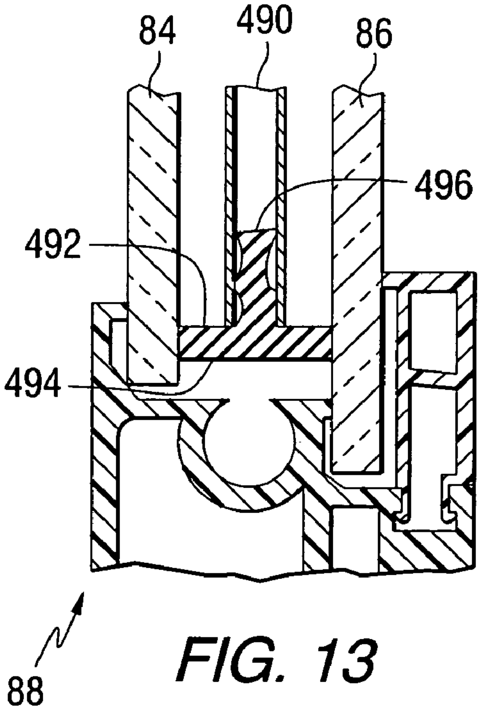
FIG. 13 is a view taken along lines 13-13 of FIG. 12.
Figure 14:
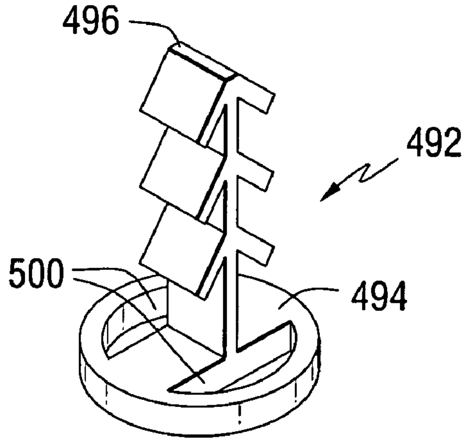
FIG. 14 is a perspective view of one non-limiting embodiment of a muntin clip of the present invention.

It is contemplated in the assembly of a glazing unit of the type discussed herein that muntin bars can be used to simulate a multi-paneled unit as shown in FIG. 12. To achieve this effect, in one embodiment of the invention, muntin bars 490 are positioned in the sash frame 88 after the first sheet 84 is in position but prior to the positioning of the second sheet 86. Referring to FIG. 13, the muntin bars 490 are held in place between the glass sheets 84 and 86 by a clip 492 that is inserted into the end of a muntin bar 490. Base 494 of the clip 492 is shaped and constructed so that when placed between the two glass sheets 84 and 86, it will compress and hold the muntin bars in place. More specifically and referring to FIG. 14, the muntin clip 492 consists of two areas: the top or Christmas tree 496 that is inserted into the ends of the muntin bar, and the compressible base 494. The base 494 of the clip 492 is larger than the space between the two glass sheets 84 and 86. In this manner, when the clip 492 is between the sheets 84 and 86 and the sheets are in position in the sash frame, the sheets will compress the base 494 and will hold the clips 492 in place. In the particular non-limiting embodiment of the invention shown in FIG. 14, the base 494 is basically circular in shape and has a plurality of cutout areas 500 to allow the base to compress more easily. It is contemplated that the base 494 can have a variety of different shapes and can also be solid.

Figure 16:
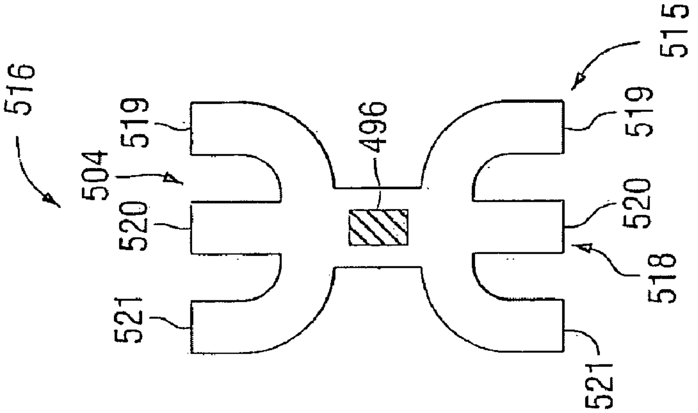
FIG. 16 is a plan view of still another non-limiting embodiment of a muntin clip of the present invention, with portions removed for purposes of clarity.
Figure 15:
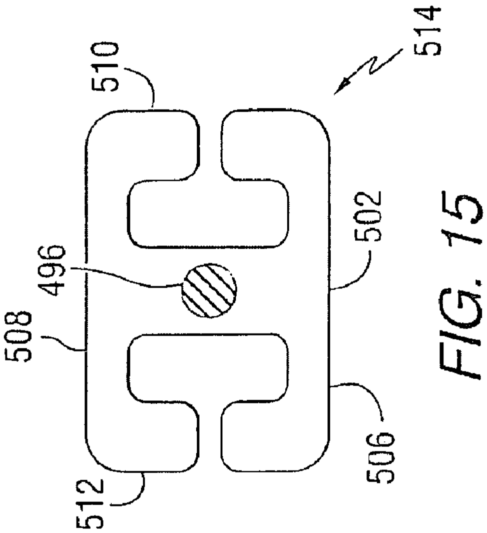
FIG. 15 is a plan view of another non-limiting embodiment of a muntin clip of the present invention, with portions removed for purposes of clarity.

More particularly and with reference to FIGS. 15 and 16, there are shown additional non-limiting embodiments of a base 502 and 504 for clips 514 and 515, respectively, of the invention. The base 502 has generally straight surfaces 506 and 508 for engaging the inner surface of adjacent sheets, e.g. inner surface of the sheets 84 and 86, and open sides 510 and 512. The open sides 510 and 512 allow base 502 to compress without excess deformity of the base. The base 504 has a pair of opposed sides 516 and 518, each side having a plurality of fingers, e.g. three spaced fingers 519, 520 and 521. The fingers 519, 520 and 521 engage the inner surfaces of the sheets. The three spaced fingers provide for compression of the base without excess deformation of the base 504.

Figure 17:
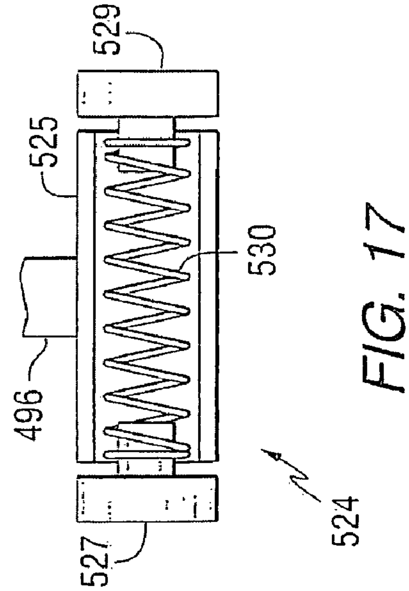
FIG. 17 is a side view of another non-limiting embodiment of a muntin clip of the present invention, with portions removed for purposes of clarity.

Shown in FIG. 17 is a muntin clip 524 that includes a cylinder 525 having a connection 496 to the muntin bars, e.g. a tree-like configuration as discussed earlier, on the outer surface and end caps 527 and 529, preferably captured in the ends of the cylinder in any convenient manner. The end caps are biased away from one another by a spring 530. In the practice of the invention, but not limiting thereto, after the sheet 84 (see FIG. 3) is mounted in the sash frame as previously discussed, the muntin lattice is place in the sash frame with one of the end caps, e.g. end cap 527 engaging the inner surface of the sheet 84. Thereafter the sheet 86 is placed in the sash frame on the end cap 529. As the sheets move together the end caps move toward one another against the biasing action of the spring 530 to secure the clip 524 in position between the sheets 84 and 86. As can be appreciated, the clip 524 without the tree connector can be used as a retainer to bias the sheet 84 against the wall 98 as was discussed for the retainers shown in FIG. 8A.

Although not required, the material used in the making of the clips 492, 514, 515 and 524 should be resistant to ultraviolet exposure, made of a thermoset plastic to survive elevated temperatures in the event an oven heating is necessary during the fabrication of the unit, and the base must not compress to the extent that it becomes loose between the glass sheets. Non-limiting examples of material that can be used to fabricate the clip include nylon, polypropylene and injection moldable plastic.

Although the clips 492, 514, 515 and 524 were discussed for use with the integrated window sash of the invention, it can now be appreciated that the clip can also be used to secure muntin bars 490 between the glass sheets 36 and 38 of the prior art glazing unit 32 discussed above and shown in FIG. 1. More particularly, with varying air spaces, the clips 492, 514, 515 and 524 will vary in size to accommodate the differences, although a clip designed for a certain air space thickness can accommodate another air space if the difference in thickness is small. The compression range of the base 494 provides a wide array of interference fits, making it useful in a variety of spacer/sealant systems. Because the clips 492, 514, 515 and 524 are not physically inserted into a spacer element, e.g. the surface of a spacer frame facing the space between the glass sheets or the sash members of the unitless sash of the instant invention that holds the glass sheets in spaced apart relation, the clips 492, 514, 515 and 524 are usable in a variety of insulating glass unit systems such as Intercept®, Swiggle®, Super Spacer®, Insuledge®, and TPS® systems, as well as other types of systems that use an aluminum, plastic or fiberglass spacer frame.

In addition, the type of sealant system used to seal the glazing unit will not affect the use of this clip. The clips 492, 514, 515 and 524 will be compatible with single seal, (both thermoplastic and room temperature curing) double seal, (these double seal units can be made using a variety of sealants in combination) or any other edge configuration used in the making of an insulating-glass unit.

With reference to FIG. 11, in another non-limiting embodiment of the invention, muntin bars 490 are secured to the surface of a sheet, e.g. but not limiting to the invention, inner surface of the glass sheet 460 by a double backed tape 556 having one surface of the tape adhered to the muntin lattice and the opposite side of the tape adhered to the inner major surface of the sheet. Optionally, instead of using double back tape, a compressible material similar to the material of the base 494 of clip 492 having adhesive surfaces mounts the muntin bars to the sheet surface.

Figure 18:
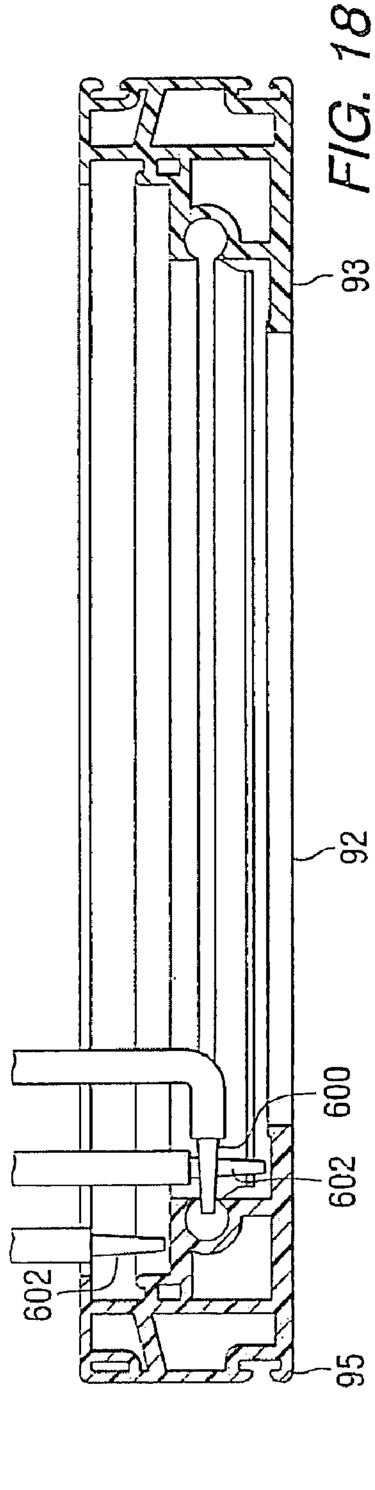
FIG. 18 is a cross-sectional view of a sash frame illustrating multiple nozzles for extruding sealant and desiccant on the sash frame.

In the fabrication of the window sash of the invention, the sealants and/or desiccant can be individually or simultaneously extruded onto surfaces of the individual sash members or a preassembled window sash through an extruder head or a multi-head extruder. Depending on the configuration of the desiccant groove (see FIG. 9 and the discussion relate thereto), a nozzle 600 of an extruder head may be in line with a sealant nozzles 602 or perpendicular to the sealant nozzles 602, for example as shown in FIG. 18. The nozzle could be a one multi-port nozzle or include multiple individual nozzles that will allow for the simultaneous application of the desiccant medium 304 in or on base 102 and the layers 114 and 120 of the adhesive sealants in the sealant grooves 128 and 132 of walls 98 and 100, respectively. The nozzles can be used to apply hot (such as hot melt butyls and DSE sealants) and/or room temperature sealants (polyurethanes, polysulfides, silicones, etc.) and desiccant materials. Nozzle tips can be various shapes depending on groove configuration. The nozzle controls the amount of material applied to achieve desired shape and thickness of sealant bead.

In the fabrication of insulating units it is preferred to have dry gas in compartment 110 shown in FIG. 3, between adjacent sheets e.g. air, krypton, argon or any other type of thermally insulating gas. When air is the insulating gas, the glazing unit can be fabricated in the atmosphere to capture the atmosphere in the compartment between the sheets as the window sash is assembled. In the instance where an insulating gas is of a particular purity or other than atmospheric air is desired in the compartment, one or more vent holes 620, as shown in FIG. 3, can be provided through one or more webs of one of the sash members. The holes 620 provide a passageway from compartment 110 to the peripheral edge 622 of the sash frame 88. Gas is moved into the compartment 110 through the holes 620 or through a conduit 378 as shown in FIG. 11 in any usual manner, e.g. as disclosed in U.S. Pat. No. 5,531,047, which disclosure is hereby incorporated by reference. After the compartment 110 is filled, at least the hole 620 in the base 102 of the sash member or the conduit is hermetically sealed. As can be appreciated, the compartment 110 between the sheets 84 and 86 can be open to the environment by having holes moving air into and out of the compartment e.g. as disclosed in U.S. Pat. No. 4,952,430, which patent is hereby incorporated by reference. When air is continuously moved into and out of the compartment, any coating on the inner surfaces 198 and 124 of the glass sheets 84 and 86, respectively, should be capable of being in continuous contact with the atmosphere without deterioration. Further, the coating disclosed in U.S. Pat. No. 6,027,766 discussed above can be used on the inner surface of the glass sheets. Still further, the compartment between the sheets can be connected to the environment by way of a tube filled with a desiccant, e.g. as is known in the art. In this manner, air moves into and out of the compartment through the desiccant.

The integrated window sash having an insulating vision area incorporating features of the present invention provides an economical window sash having improved thermal performance. The window sash is economical to make because it eliminates the need to make an insulating unit. The window sash has improved performance because the window heat gain and loss is through the frame and not the edge area of the insulating glazing unites. Using sashes made from hollow core extruded vinyl; foam filled extruded vinyl, cellular structural foam materials, plus extruded wood/plastic composites in the practice of the invention would be expected to gain similar thermal performance improvements. The integrated window sash of the invention does not require that edges of sputtered coated glass be removed because the coating is on the inner surface of the glass and the layer of the adhesive sealant is on the outer surface of the sheet.

As discussed earlier, it is contemplated that the sash members can be co-extruded with selected other features of the sash frame. These additional features can be the same as or be a different material from the remaining portion of the sash member. For example and without limiting the present invention, the following is a list of sash frame components that can be co-extruded with the sash member. It should be appreciated that combinations of these components can also be co-extruded with the sash member.

a) A desiccant: this would eliminate the need for a secondary application of a desiccant, and b) An adhesive sealant: this would eliminate the need for a secondary application of the adhesive-sealants.

It is also contemplated that the sash members can be extruded as discussed above and a metal tape or foil be applied to the base of the member as it is being formed or very soon thereafter. In this manner, a continuous sash member can be formed with the barrier layer already applied so that the sash member can be further processed to produce a sash frame and integrated window sash.

It should be appreciated that other processes can be used to form the sash members. For example, rather than being extruded to the desired shape, the cross-section can be formed by a pultrusion process, as is well know in the art. In a pultrusion process, fiber glass strands are typically used as a reinforcement. Fiber glass is pulled through a die having the desired cross section and the desired polymeric material is formed around the fiber glass as it is pulled. Using this type of process, the barrier layer can also be formed over the base portion of the sash member. More specifically, a plastic layer can be formed on the base as the sash member is formed, or a metal layer can be applied to the base of the member as it is being formed or very soon thereafter.

Based on the description of the embodiments of the invention, it can be appreciated that this invention is not limited to the particular embodiments disclosed, but it is intended to cover modifications that are within the spirit and scope of the invention, as defined by the appended claims.

What is claimed is:

1. A method of making an integrated window sash, comprising:

providing a sash frame having a first sheet supporting surface, a second sheet supporting surface, a ledge connected to the second sheet supporting surface and extending away from the second sheet supporting surface, a base extending from the first sheet supporting surface toward the second sheet supporting surface, and a layer of a low gas and moisture permeability material on the base and facing open area defined by the sash frame;

applying a first layer of an adhesive sealant having a low gas and moisture permeability on the first sheet supporting surface;

applying a second layer of an adhesive sealant having a low gas and moisture permeability on the second sheet supporting surface;

applying a layer of a moisture pervious matrix having a desiccant therein over the surface of the base;

moving a first sheet having a first major surface, an opposite second major surface and a peripheral edge connecting the first and the second major surfaces into the spacer frame against the first layer of the adhesive sealant to secure the first surface of the first sheet against the first sheet supporting surface, wherein as the first sheet is moved over the layer of the moisture pervious matrix toward the first layer of the adhesive sealant, the peripheral edge of the first sheet moves over, is spaced from, and out of contact with, the layer of the moisture perilous matrix;

providing a flexible sheet retainer having a first end portion and a second end portion;

positioning the first end portion of the sheet retainer in facing relationship to the second surface of the first sheet;

providing a second sheet having a first major surface and an opposite second major surface and moving the first surface of the second sheet against the second end portion of the sheet retainer to move the first end portion of the sheet retainer against the second surface of the first sheet to compress the sheet retainer between the second surface of the first sheet and the first surface of the second sheet, and to move the first surface of the second sheet against the second layer to secure the first surface of the second sheet against the second sheet supporting surface, wherein the first surface of the second sheet is spaced from, and in facing relationship to, the second surface of the first sheet to provide a compartment therebetween, and the desiccant is in communication with the compartment, and wherein after the practice of moving the second sheet, the first end portion of the sheet retainer is biased against at least the second surface of the first sheet to move the first sheet toward the first sheet supporting surface, and securing a preformed holding component to the ledge of the sash frame, wherein the holding component engages, and is continuous, around marginal edges of the second surface of the second sheet, wherein the holding component frames the second sheet.

2. The method according to claim 1, further comprising providing a groove in the base of the sash frame between the first and the second sheet supporting surfaces and applying the layer of the moisture pervious matrix in the groove, wherein the layer of the matrix is equal to or below the surface of the base.

3. A method of making an integrated window sash comprising:

feeding a plastic resin into a first material receiver of a co-extruder, an adhesive resin into a second receiver of the co-extruder and a barrier layer resin into a third receiver of the co-extruder;

moving the resins through a forming die of the co-extruder to form a lineal having first and second sheet supporting surfaces interconnected by a base and a barrier layer secured to the base by the adhesive resin, wherein the first and the second sheet supporting surfaces face in the same direction;

cutting the lineal to provide at least one sash member;

forming a sash frame from the at least one sash member;

applying a layer of a moisture impervious adhesive sealant on the first sheet supporting surface, a layer of moisture impervious adhesive sealant on the second sheet supporting surface, and a layer of a moisture pervious matrix having a desiccant therein on the base;

moving a first sheet having a first major surface and an opposite second major surface into the spacer frame over and spaced from the matrix to move the first major surface of the first sheet against the first layer;

providing a flexible sheet retainer having a first end portion and a second end portion, and positioning the sheet retainer between the first and the second sheet supporting surfaces with the first end portion of the sheet retainer in facing relationship to the second surface of the first sheet, and moving a second sheet having a first major surface and an opposite major surface toward the second layer to move the first end portion of the sheet retainer against the second surface of the first sheet to compress the sheet retainer between the second surface of the first sheet and the first surface of the second sheet and to move the first major surface of the second sheet against the second layer, wherein the first end portion of the sheet retainer is biased against at least the second surface of the first sheet to move the first sheet toward the first sheet supporting surface and the first surface of the second sheet is spaced from the second surface of the first sheet to provide a compartment therebetween and the desiccant is in communication with the compartment.

4. The method according to claim 3, wherein the lineal further comprises a back web opposite the base; cutting the lineal provides a sash member having a first end, an opposite second end and a plurality of V-shaped cutouts between the first and second ends, wherein sloping walls of the V-shaped cutout join at the back web, and forming a the sash frame comprises bending the sash member at the V-shaped cutouts to bring the first and the second ends of the sash member into contact with one another and to decrease distance between the sloping walls of each of the V-shaped cut outs.

5. The method according to claim 3 wherein the cutting the lineal comprises cutting the lineal into a plurality of sash members, and the forming the sash frame comprises joining ends of the plurality of sash member to form the spacer frame.

6. A method of making an integrated window sash, comprising:

feeding fiber glass strands through a forming die of a pultrusion device;

feeding a polymeric material into a first material receiver of the pultrusion device, an adhesive material into a second receiver of the pultrusion device, and a barrier layer material into a third receiver of the pultrusion device;

pulling the fiber glass strands through the forming die as the polymeric material is formed around the strands to produce a lineal having first and second sheet supporting surfaces facing in the same direction, a base having a surface that connects the first and second sheet supporting surfaces, and a barrier layer secured to the surface of the base by the adhesive material;

cutting the lineal to provide a plurality of sash members;

joining the ends of adjacent sash members to provide a sash frame;

applying a layer of a moisture impervious adhesive sealant on the first sheet supporting surface, a layer of moisture impervious adhesive sealant on the second sheet supporting surface, and a layer of a moisture pervious matrix having a desiccant therein on the base;

moving a first sheet having a first major surface, an opposite second major surface and a peripheral edge connecting the first and the second major surfaces into the spacer frame against the first layer of the adhesive sealant to secure the first surface of the first sheet against the first sheet supporting surface, wherein as the first sheet is moved over the moisture pervious matrix toward the first layer, the peripheral edge of the first sheet moves over, is spaced from, and out of contact with, the layer of the moisture pervious matrix;

providing a compressible sheet retainer having a first end portion and an opposite second end portion, and positioning the first end portion of the sheet retainer against the second surface of the first sheet, and moving a second sheet having a first major surface and an opposite major second surface toward the second layer to move the first major surface of the second sheet against the second layer, wherein the first surface of the second sheet is spaced from the second surface of the first sheet to provide a compartment therebetween and the desiccant is in communication with the compartment, wherein during the moving of the second sheet, contacting the second end portion of the sheet retainer with the first surface of the second sheet to compress the sheet retainer between the second surface of the first sheet and the first surface of the second sheet.

7. The method according to claim 6 further comprising positioning muntin bars between the first and the second sheets to simulate a multi-paneled unit.

8. The method according to claim 7, wherein the ends of the plurality of the sash members are mitered ends and further joining the mitered ends by heating the ends of adjacent sash member to soften the ends of the sash member, and moving the heat softened ends together to join the ends.

* * * * *